US008494058B2

United States Patent
Chang et al.

(10) Patent No.: US 8,494,058 B2
(45) Date of Patent: *Jul. 23, 2013

(54) VIDEO/IMAGE PROCESSING APPARATUS WITH MOTION ESTIMATION SHARING, AND RELATED METHOD AND MACHINE READABLE MEDIUM

(75) Inventors: Te-Hao Chang, Taipei (TW); Chung-Yen Lu, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/607,786

(22) Filed: Sep. 9, 2012

(65) Prior Publication Data
US 2012/0328025 A1 Dec. 27, 2012

Related U.S. Application Data

(63) Continuation-in-part of application No. 12/143,854, filed on Jun. 23, 2008, now Pat. No. 8,284,839.

(51) Int. Cl.
*H04N 7/26* (2006.01)
(52) U.S. Cl.
USPC ....... 375/240.16; 348/452; 382/236; 382/261
(58) Field of Classification Search
USPC ...... 375/240.17–240.24; 348/208.99–210.99, 348/441–461, 607–624; 382/261
See application file for complete search history.

(56) References Cited

U.S. PATENT DOCUMENTS

| 5,247,355 A | 9/1993 | Frederiksen | |
|---|---|---|---|
| 6,118,487 A | 9/2000 | Hirtz | |
| 6,151,075 A * | 11/2000 | Shin et al. | 348/459 |
| 6,414,992 B1 * | 7/2002 | Sriram et al. | 375/240.13 |
| 6,519,287 B1 | 2/2003 | Hawkins | |
| 7,010,045 B2 | 3/2006 | Lee | |
| 7,551,673 B1 | 6/2009 | Oh | |
| 8,184,200 B1 * | 5/2012 | Biswas et al. | 348/459 |
| 2004/0179599 A1 | 9/2004 | Lakshmanan | |
| 2004/0233990 A1 | 11/2004 | Sekiguchi | |
| 2005/0110902 A1 * | 5/2005 | Yang | 348/452 |
| 2005/0195324 A1 * | 9/2005 | Lee | 348/441 |

(Continued)

FOREIGN PATENT DOCUMENTS

| CN | 1175157 A | 3/1998 |
|---|---|---|
| CN | 1330493 A | 1/2002 |
| TW | 201002075 | 1/2010 |
| WO | 2008027508 | 3/2008 |

*Primary Examiner* — Michael Thier
*Assistant Examiner* — Vincelas Louis
(74) *Attorney, Agent, or Firm* — Winston Hsu; Scott Margo

(57) ABSTRACT

A video/image processing apparatus includes a storage module, a motion estimation module, and a plurality of video/image processing blocks. The storage module is arranged for storing a plurality of images. The motion estimation module is coupled to the storage module, and arranged for retrieving the images from the storage module, and generating motion vectors according to the images. The video/image processing blocks are coupled to the motion estimation module, and arranged for performing a plurality of different video/image processing operations, respectively, wherein each of the video/image processing blocks receives the motion vectors generated from the motion estimation module, and refers to the received motion vectors to perform a designated video/image processing operation. By way of example, the video/image processing operations may include frame rate conversion, video decoding, noise reduction, deinterlacing, super resolution processing, video stabilization, multi-frame image noise reduction, camera stabilization, high dynamic range (HDR) processing, and/or rolling-shutter reduction.

21 Claims, 26 Drawing Sheets

U.S. PATENT DOCUMENTS

| | | |
|---|---|---|
| 2005/0201466 A1* | 9/2005 | Kim et al. ................ 375/240.16 |
| 2006/0002465 A1 | 1/2006 | Raveendran |
| 2006/0062306 A1 | 3/2006 | Ha |
| 2006/0165176 A1 | 7/2006 | Raveendran |
| 2007/0070250 A1* | 3/2007 | Zhou et al. .................... 348/607 |
| 2007/0092146 A1 | 4/2007 | Alvarez |
| 2007/0121724 A1 | 5/2007 | Van Zon |
| 2007/0201560 A1* | 8/2007 | Segall et al. ............. 375/240.24 |
| 2007/0206678 A1* | 9/2007 | Kondo .................... 375/240.17 |
| 2007/0291127 A1* | 12/2007 | Prieto et al. .............. 348/208.99 |
| 2009/0160957 A1* | 6/2009 | Deng et al. ............... 348/208.99 |
| 2010/0220939 A1* | 9/2010 | Tourapis et al. .............. 382/261 |
| 2011/0211637 A1 | 9/2011 | Blum |

* cited by examiner

VIDEO/IMAGE PROCESSING APPARATUS WITH MOTION ESTIMATION SHARING, AND RELATED METHOD AND MACHINE READABLE MEDIUM

CROSS REFERENCE TO RELATED APPLICATIONS

This is a continuation-in-part of co-pending U.S. patent application Ser. No. 12/143,854, filed on Jun. 23, 2008 and incorporated herein by reference.

BACKGROUND

The present invention relates to processing a video/image input, and more particularly, to a video/image processing apparatus for performing a plurality of different video/image processing operations according to the same motion vectors generated from a shared motion estimation module, and related method and machine readable medium.

Please refer to FIG. 1, which is a diagram of a conventional ME/MC frame rate conversion circuit 100 that converts a film, movie or animated source having a sample rate of 24-30 Hz into a display video stream having a sample rate of 50-60 Hz or 100-120 Hz, the frame rate conversion circuit 100 includes a motion estimation circuit 110, a motion compensation circuit 120, and a storage unit such as a DRAM 130. The DRAM 130 temporarily stores input frames, and the motion estimation circuit 110 retrieves two frames (a current frame and a previous frame) from the DRAM 130 and compares them to generate a motion vector indicating the motion of a pixel corresponding to the location movement of the pixel from a previous frame to a current frame. The motion compensation circuit 120 also retrieves the two frames from the DRAM 130, which are processed together with the motion vector received from the motion estimation circuit 110 for generating a frame to be interpolated between the current frame and the previous frame.

After carrying out the above operations, which are collectively called frame rate conversion with motion judder cancellation (MJC), the output video has a higher frame rate than the input video with reduced judder artifact. The frame rate conversion circuit 100 can therefore correctly interpolate the intermediate frames even when the objects and background in the frames are moving.

Motion estimation and motion compensation are also utilized in video coding, as shown in FIG. 2. The video encoder 200 is utilized to compress the input video stream by removing the redundancy of the input frames; in other words, the output compressed stream of the video encoder 200 that is transmitted to the receiving end only includes the difference between each two adjacent frames. The receiving end then reconstructs the original frame stream by compensating for the difference.

The video encoder 200 therefore includes a DRAM 230 for temporarily storing input frames, and a motion estimation circuit 210 for retrieving two frames (i.e. an I-frame and a P-frame) from the DRAM 230 and comparing the two frames to generate a residue and a motion vector indicating the difference between the two frames. The residue is then encoded by a block encoding circuit 240, and sent to the bit stream generator 260 to generate a compressed bit-stream. A block decoding circuit 250 and a motion compensation circuit 220 simulate the operations that the receiving end takes to reconstruct the original frame stream: the block decoding circuit 250 decodes the encoded residue, and the motion compensation circuit 220 generates a reconstructed frame according to the residue generated by the block decoding circuit 250 and the motion vectors generated by the motion estimation circuit 210. The reconstructed frame, which is utilized as the P-frame in the next encoding cycle, is stored into the DRAM 230 before being retrieved by the motion estimation circuit 210.

However, the data compression and the frame rate conversion operations are always performed independently, which considerably wastes resources and requires a large chip area for the duplicate motion estimation circuits and motion compensation circuits.

SUMMARY

One of the objectives of the present invention is therefore to provide a video/image processing apparatus for performing a plurality of different video/image processing operations according to the same motion vectors generated from a shared motion estimation module, and related method and machine readable medium.

According to a first aspect of the present invention, an exemplary video/image processing apparatus is disclosed. The exemplary video/image processing apparatus includes a storage module, a motion estimation module, and a plurality of video/image processing blocks. The storage module is arranged for storing a plurality of images. The motion estimation module is coupled to the storage module, and arranged for retrieving the images from the storage module, and generating motion vectors according to the images. The video/image processing blocks are coupled to the motion estimation module, and arranged for performing a plurality of different video/image processing operations, respectively, wherein each of the video/image processing blocks receives the motion vectors generated from the motion estimation module, and refers to the received motion vectors to perform a designated video/image processing operation.

According to a second aspect of the present invention, an exemplary video/image processing method is disclosed. The exemplary video/image processing method includes following steps: retrieving a plurality of images from a storage module; generating motion vectors according to the images; and performing a plurality of different video/image processing operations, respectively, wherein each of the video/image processing operations is performed according to the motion vectors.

According to a third aspect of the present invention, an exemplary machine readable medium storing a program code is disclosed. When executed by a processor, the program code enables the processor to perform at least the following steps: retrieving a plurality of images; generating motion vectors according to the images; and performing a plurality of different video/image processing operations, respectively, wherein each of the video/image processing operations is performed according to the motion vectors.

By way of example, the video/image processing operations may include frame rate conversion, video decoding, noise reduction, deinterlacing, super resolution processing, video stabilization, multi-frame image noise reduction, camera stabilization, high dynamic range (HDR) processing, and/or rolling-shutter reduction.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
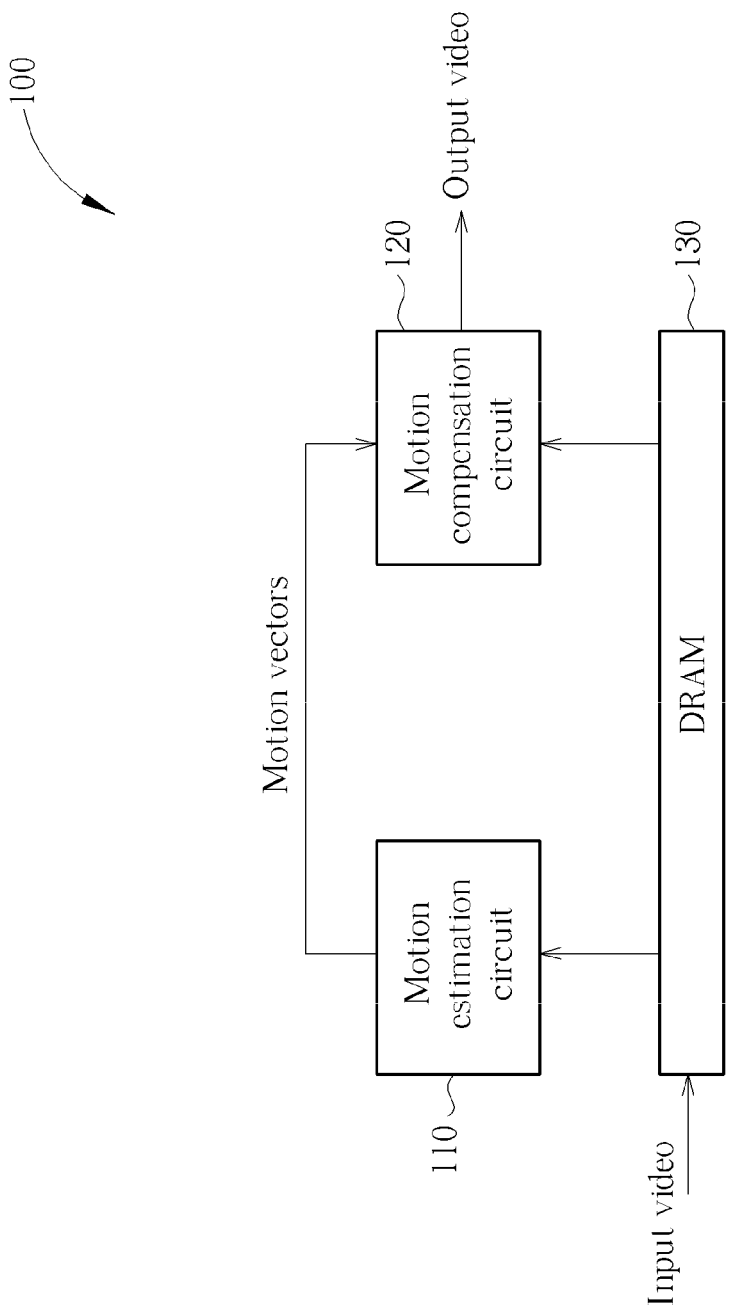
FIG. 1 is a block diagram of a conventional frame rate conversion circuit.
Figure 2:
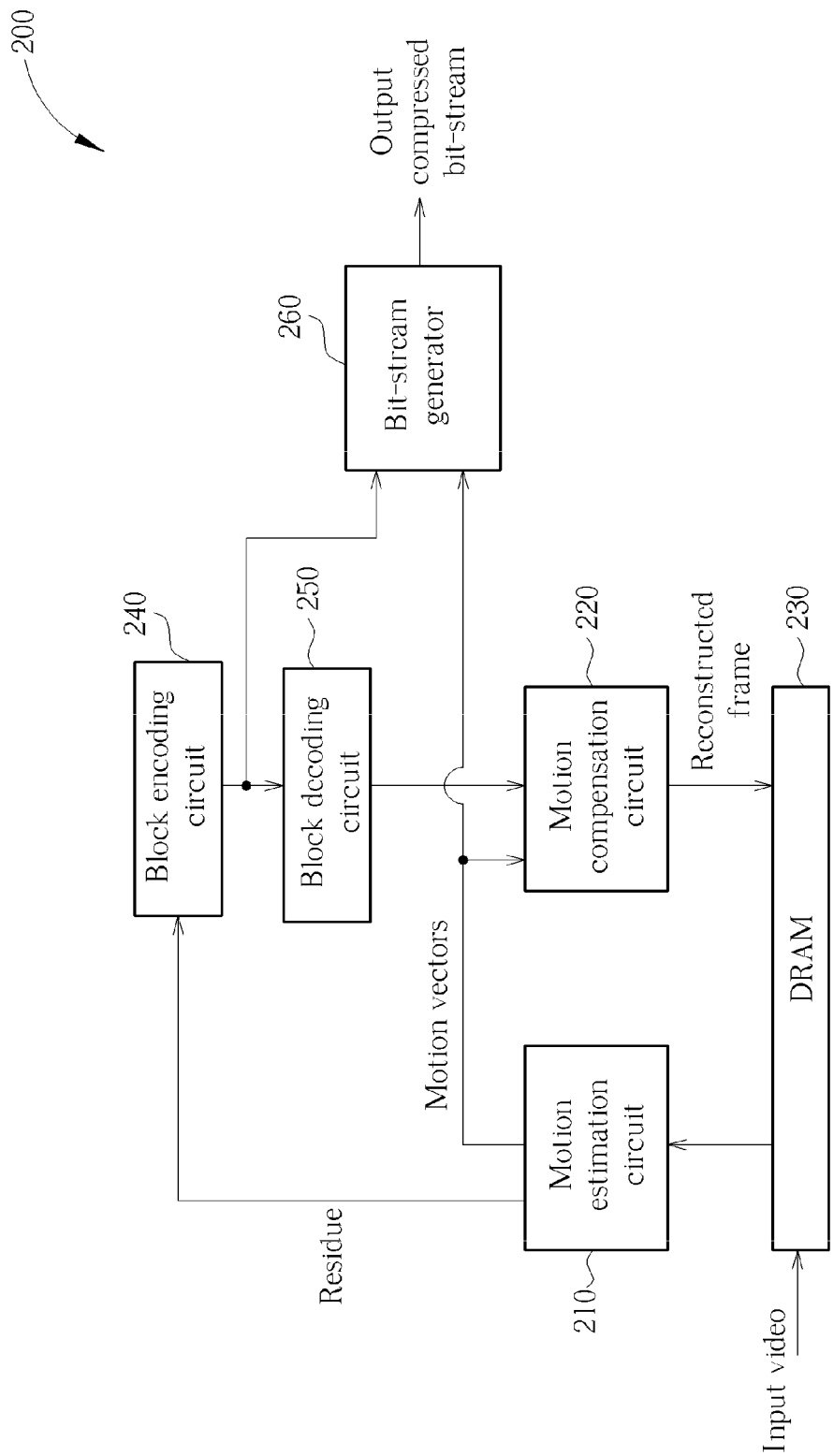
FIG. 2 is a block diagram of a conventional video encoder.
Figure 3:
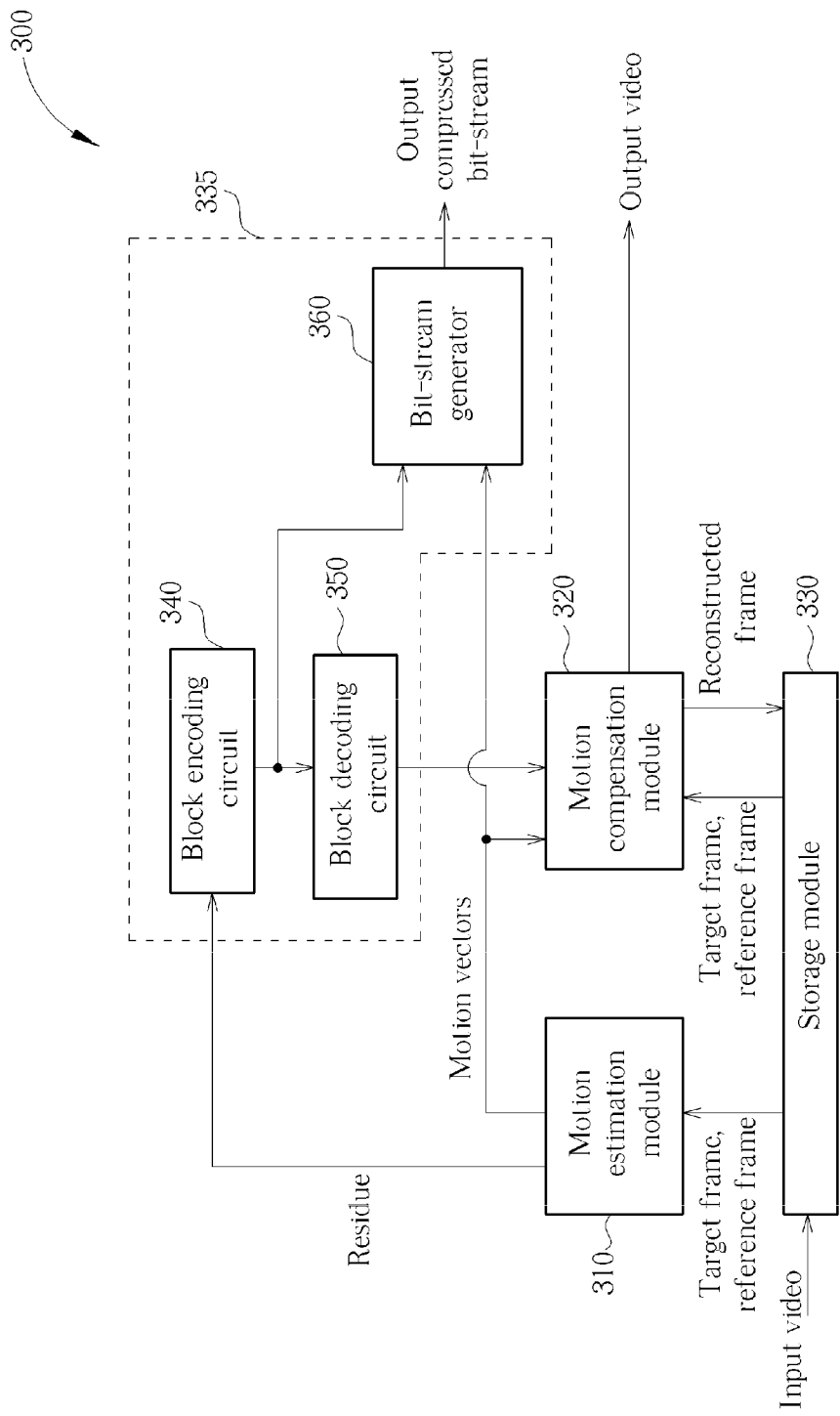
FIG. 3 is a block diagram of a video processing apparatus according to an exemplary embodiment of the present invention.

Please refer to FIG. 3, which is a block diagram of a video processing apparatus 300 according to an exemplary embodiment of the present invention. Unlike the conventional systems shown in FIG. 1 and FIG. 2 that each require one motion estimation module, one motion compensation module and one storage module to perform the frame rate conversion and video coding respectively, the video processing apparatus 300 is provided with both the frame rate conversion function and the video coding function while only one motion estimation module 310, one motion compensation module 320, one video coding module 335 and one storage module 330 are needed.

The storage module 330 can be a DRAM and stores an input video stream comprising a plurality of frames. In one embodiment, the motion estimation module 310 includes only one motion estimation unit, the motion compensation module 320 includes only one motion compensation unit, and the video processing apparatus 300 has two modes, a conversion mode and a coding mode.

When the video processing apparatus 300 is switched to the conversion mode, the video coding module 335 is controlled to become disabled, and the motion estimation module 310 and the motion compensation module 320 are configured to generate an output video stream having a frame rate different from the frame rate of the input video stream. For example, the motion estimation module 310 extracts a target frame and a reference frame from the storage module 330, and generates a motion vector according to the target frame and the reference frame. The motion vector is sent to the motion compensation module 320, which also extracts the target frame and the reference frame from the storage module 320 and generates interpolated frame(s) according to the target frame, the reference frame and the motion vector. The output video stream is generated after the motion compensation module 320 interpolates frames into the input video stream.

However, when the video processing apparatus 300 is in the coding mode, the video coding module 335 is enabled, while the motion estimation module 310 and the motion compensation module 320 are configured to perform the data compression procedure. The motion estimation module 310 extracts a target frame and a reference frame from the storage module 330 and generates a motion vector and a residue to the video coding module 335 and the motion compensation module 320 according to the target frame and the reference frame. A block coding circuit 340 in the video coding module 335 then encodes the residue to generate an encoded residue, and transmits the encoded residue to a bit-stream generator 360 and a block decoding circuit 350 in the video coding module 335. The bit-stream generator 360 generates the output compressed bit-stream according to the motion vectors and the encoded residue. Additionally, after the decoding of the encoded residue by the block decoding circuit 350, the processed residue along with the motion vectors and the reference frame are processed to generate a reconstructed frame, which is stored back into the storage module 320 by the motion compensation module 320.

The video processing apparatus 300 in this embodiment performs the frame rate conversion and the video coding at different time (the video processing apparatus 300 can only operate according to one mode each time) because the motion estimation module 310 and the motion compensation module 320 only include, respectively, one motion estimation unit and one motion compensation unit, controlled by a control signal that is selectively in the conversion mode or in the coding mode. However, the motion estimating methodology of the motion estimation module 310 can be different in the conversion mode and the coding mode in order to obtain the best solution. A first motion estimating methodology such as 3D Recursive Search (3DRS) may be adopted for frame rate conversion, and a second motion estimating methodology such as a Full search may be adopted for video coding.

Figure 4:
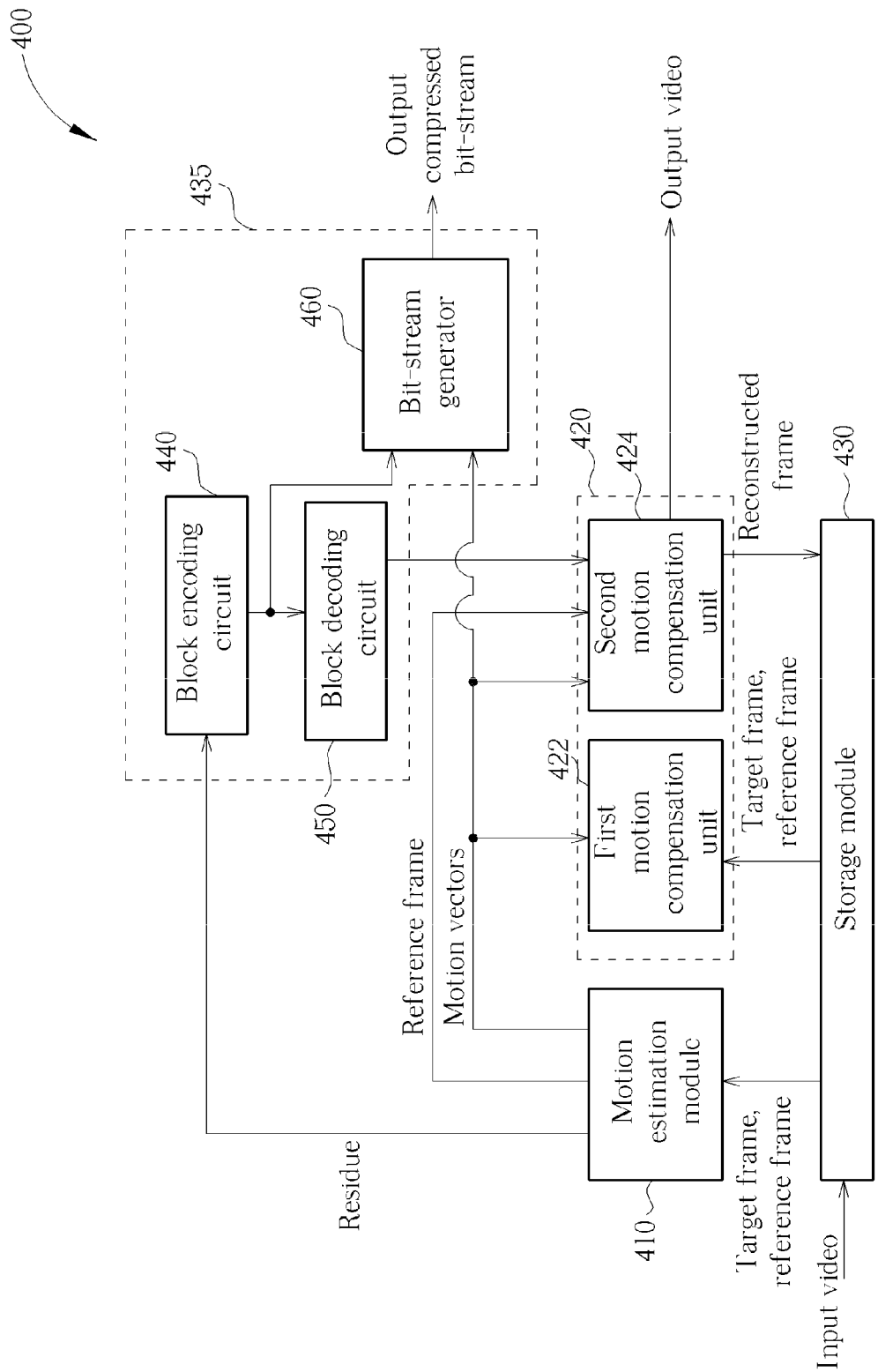
FIG. 4 is a block diagram of a video processing apparatus according to another exemplary embodiment of the present invention.

FIG. 4 shows a block diagram of a video processing apparatus 400 that can activate the frame rate conversion function and the video coding function at the same time according to one exemplary embodiment of the present invention. Compared with the above embodiment, the motion compensation module 420 of the video processing apparatus 400 is established with two motion compensation units 422 and 424, each of which is in charge of one function. For example, the first motion compensation unit 422 is in charge of frame rate conversion function; therefore, it extracts the target frame and the reference frame from the storage module 430, receives the motion vectors generated by the motion estimation module 410, and generates the output video stream having different frame rates from the input video stream according to the frames and the motion vectors. Meanwhile, the second motion compensation unit 424 is in charge of video coding; therefore, it generates the reconstructed frame according to the processed residue received from the coding module 435, the reference frame and the motion vectors received from the motion estimation module 410, and stores the reconstructed frame in the storage module 430.

As both the frame rate conversion function and the video coding function are, respectively, accomplished by a dedicated motion compensation unit, the video processing apparatus 400 does not require two modes, and therefore may not require switching functionality between two different modes. The two functionalities can be simultaneously performed, sharing motion estimation and storage interface. The bandwidth of the storage module 430 (e.g. DRAM) can be significantly reduced when compared to the conventional system that needs two motion estimation units and two motion compensation units to fulfill the frame rate conversion and video coding. Moreover, in this embodiment, the motion estimation module 410 generates the motion vectors according to a single motion estimating methodology no matter whether the motion vectors are for frame rate conversion purposes or video coding purposes since the two functions may take place at the same time. For example, the motion estimation module 410 may adopt the 3DRS methodology because, for the frame rate conversion, the 3DRS methodology is preferred.

Figure 5:
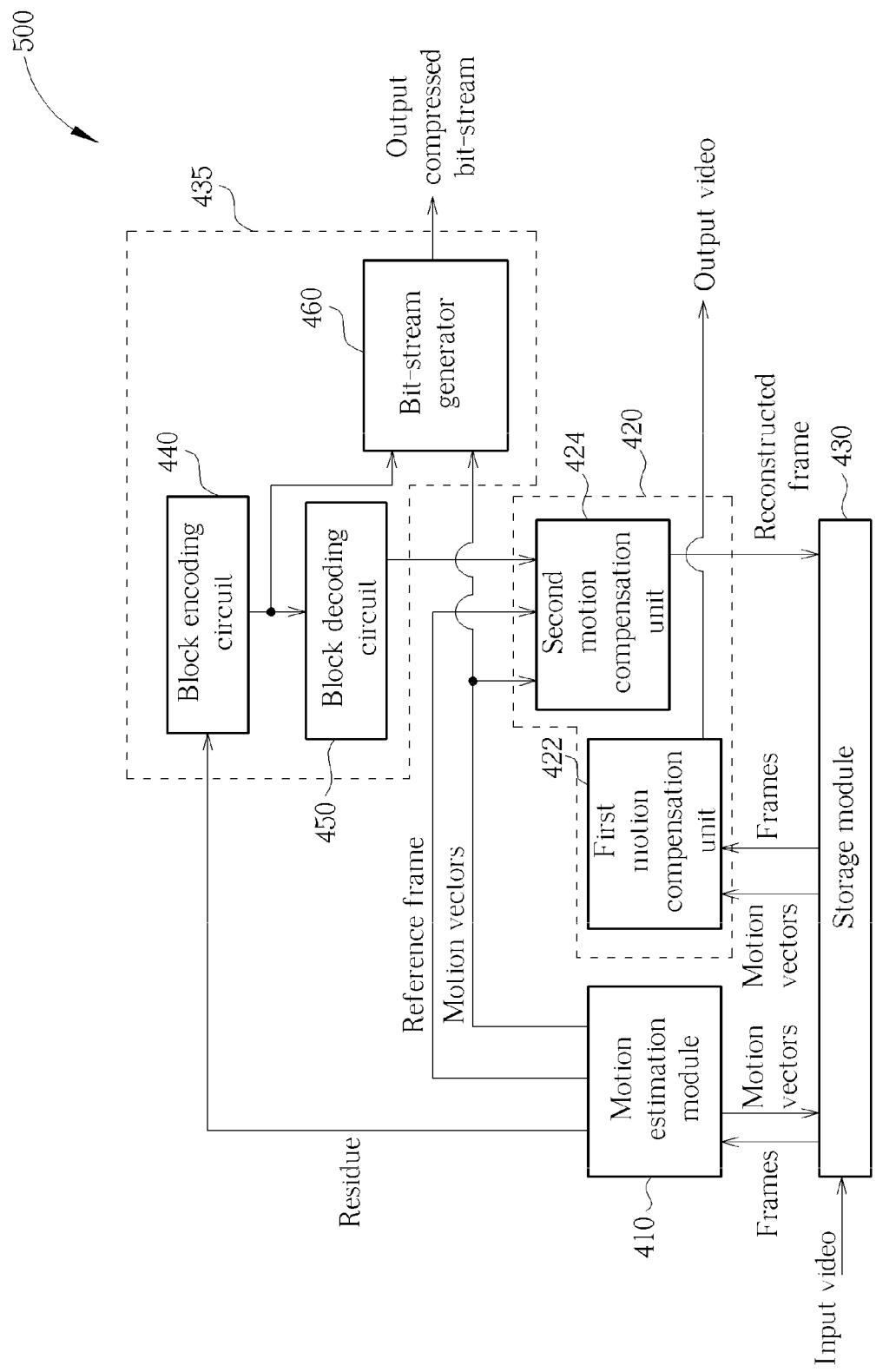
FIG. 5 is a block diagram of a video processing apparatus according to another exemplary embodiment of the present invention.

In consideration of the additional functionalities such as instant replay and rewind that a digital video system having the video processing apparatus 400 implemented therein may be provided with, a modified video processing apparatus 500 is shown in FIG. 5. The video processing apparatus 500 is able to perform video coding on a current video stream and perform frame rate conversion on previous video stream so that a display device, such as a TV in the digital video system, can replay or rewind previously received programs.

In this embodiment, the first motion compensation unit 422 and the second motion compensation unit 424 utilize different frames for frame rate conversion and video coding, respectively. Therefore, the motion estimation module 410 does not directly provide the motion vectors to the first motion compensation unit 422, but instead stores the motion vectors into a storage space (in FIG. 5, the storage space is allocated in the storage module 430; however, it can be allocated in another storage device), and the first motion compensation unit 422 further retrieves proper motion vectors from the storage space. In this way, the first motion compensation unit 422 can obtain motion vectors of a previous input video stream from the storage space to generate the output video stream having previously received programs when the instant replay/rewind function is enabled, while the second motion compensation unit 424 along with the video coding module 435 still generates the output compressed bit-stream representing the current input video stream.

Figure 6:
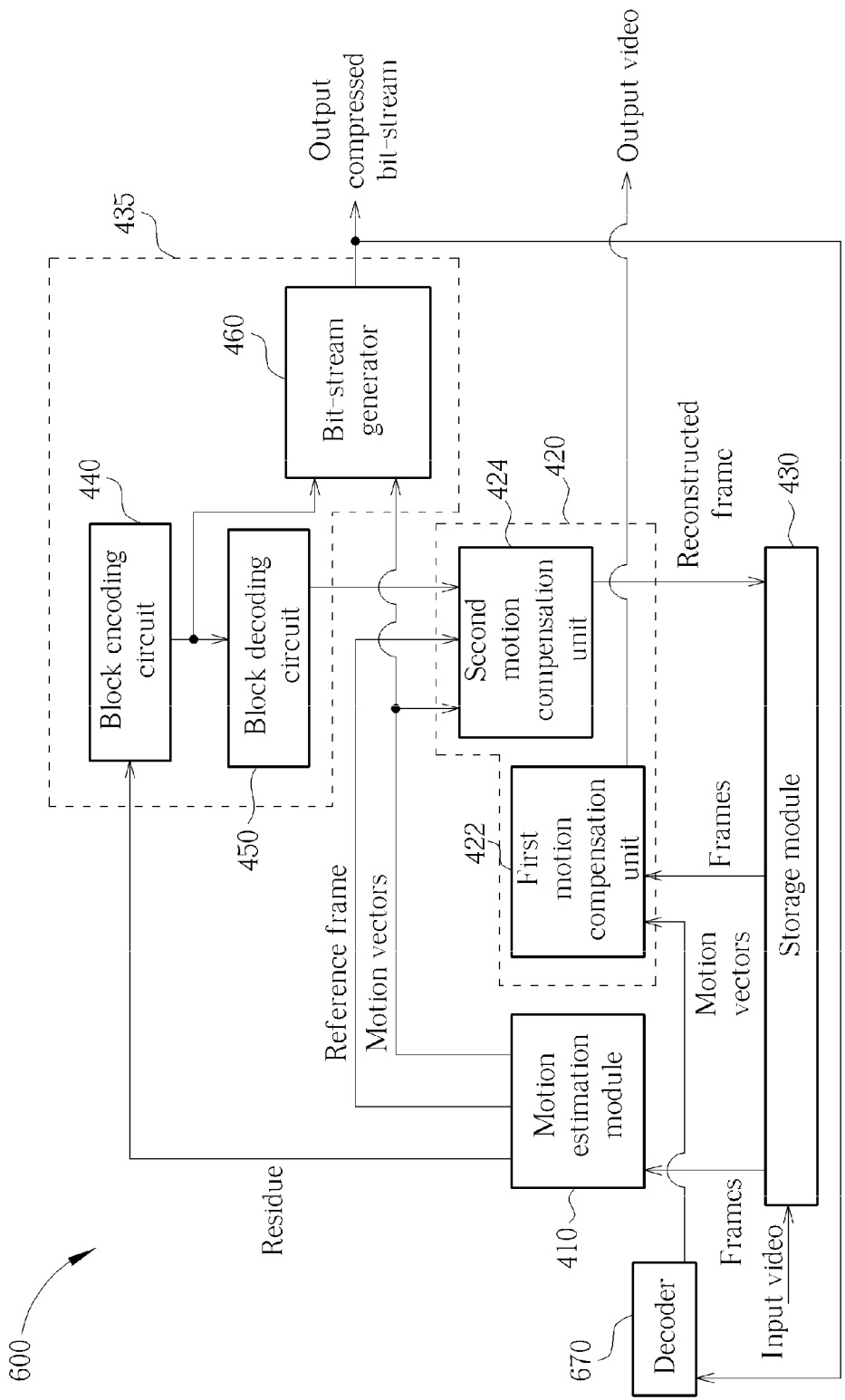
FIG. 6 is a block diagram of a video processing apparatus according to another exemplary embodiment of the present invention.

FIG. 6 is another embodiment of the video processing apparatus that supports instant replay and rewind functions. The video processing apparatus 600 further comprises a decoder 670 coupled to the bit-stream generator 460 and the first motion compensation unit 422. The bit-stream generator 460 packs the motion vectors received from the motion estimation module 410 into the output compressed bit-stream, and delivers the output compressed bit-stream to the receiving end (not shown) and the decoder 670. After the decoder 670 decodes the motion vectors from the output compressed bit-stream, the motion vectors can be utilized for next motion judder cancellation, which is performed by the first motion compensation unit 422.

Figure 7:
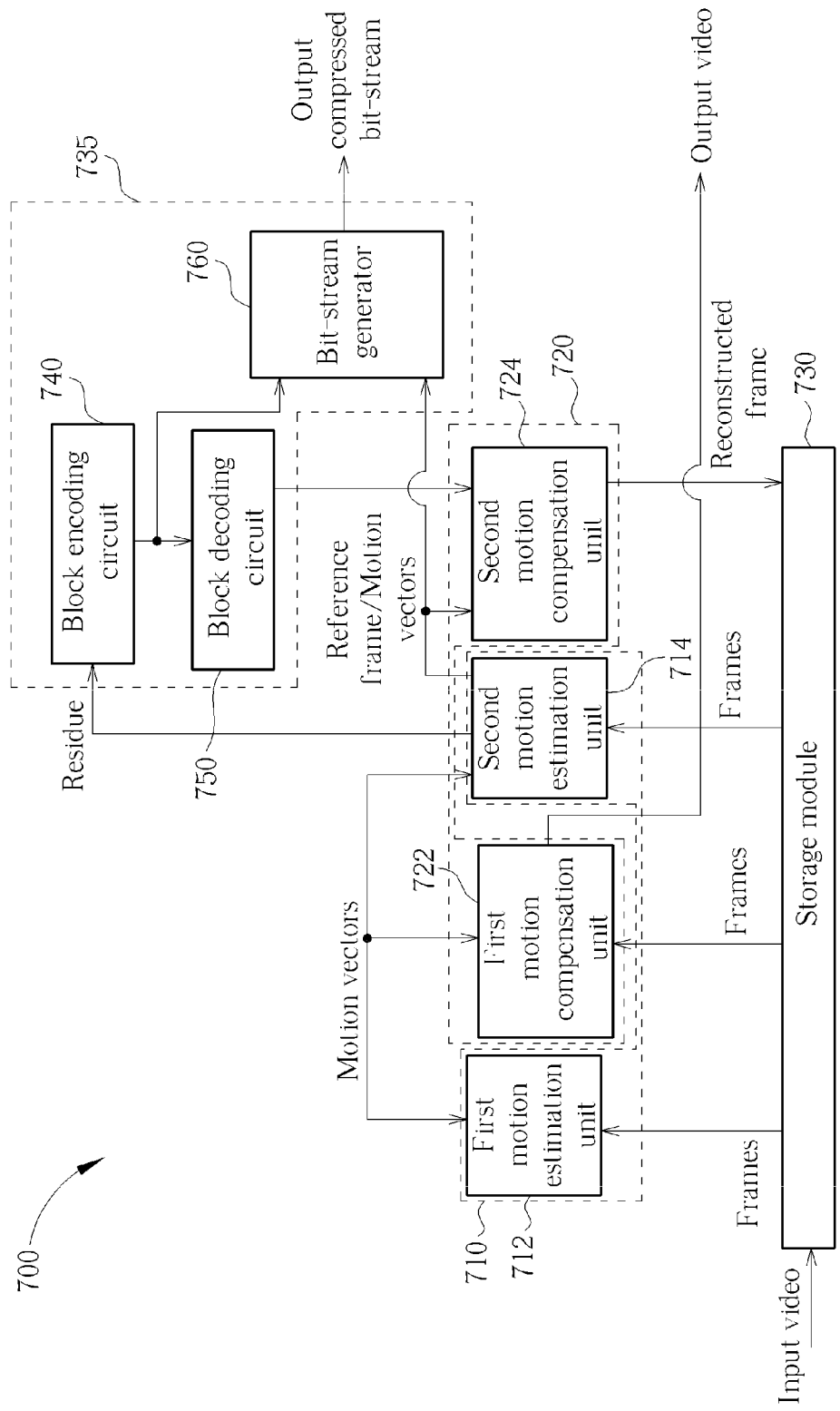
FIG. 7 is a block diagram of a video processing apparatus according to another exemplary embodiment of the present invention.

The following discloses a video processing apparatus according to another embodiment of the present invention. The video processing apparatus 700 shown in FIG. 7 includes two motion estimation units 712 and 714, and two motion compensation units 722 and 724, wherein the first motion compensation unit 722 is in charge of motion judder cancellation of frame rate conversion, and the second motion compensation unit 724 is in charge of video coding; these motion compensation units are substantially the same as the motion compensation units 422 and 424 disclosed above. Therefore, the video processing apparatus 700 can also activate the frame rate conversion and the video compression at the same time.

The first motion estimation unit 712 generates motion vectors to the first motion compensation unit 722, and the second motion estimation unit 714 generates motion vectors to the second motion compensation unit 724, and generates residue to the video coding module 735. However, the two motion estimation units 712 and 714 share essential information (e.g. motion vectors) between each other, thereby reducing the computation amount, and further improving the motion estimation performance.

For example, one motion estimation unit (for example, the second motion estimation unit 714) receives motion vectors generated by the other motion estimation unit (the first motion estimation unit 712) instead of generating the motion vectors itself. The advantages of reduced computation, faster convergence and improved compression efficiency are therefore achieved. After receiving the motion vectors from the first motion estimation unit 712, the second motion estimation unit 714 can refine the motion vectors according to a motion estimating methodology that is different from that used in the first motion estimation unit 712 in order to improve the efficiency and performance. For example, the first motion estimation unit 712 generates primary motion vectors according to the 3DRS methodology, and the second motion estimation unit 714 further refines the primary motion vectors from the first motion estimation unit 712 according to the full search methodology with a smaller search range, thereby reducing computation.

Note that the information shared between the first and second motion estimation units 712 and 714 is not limited to motion vectors, and the primary motion vectors can be generated by the second motion estimation unit 714 and refined by the first motion estimation unit 712.

Figure 8:
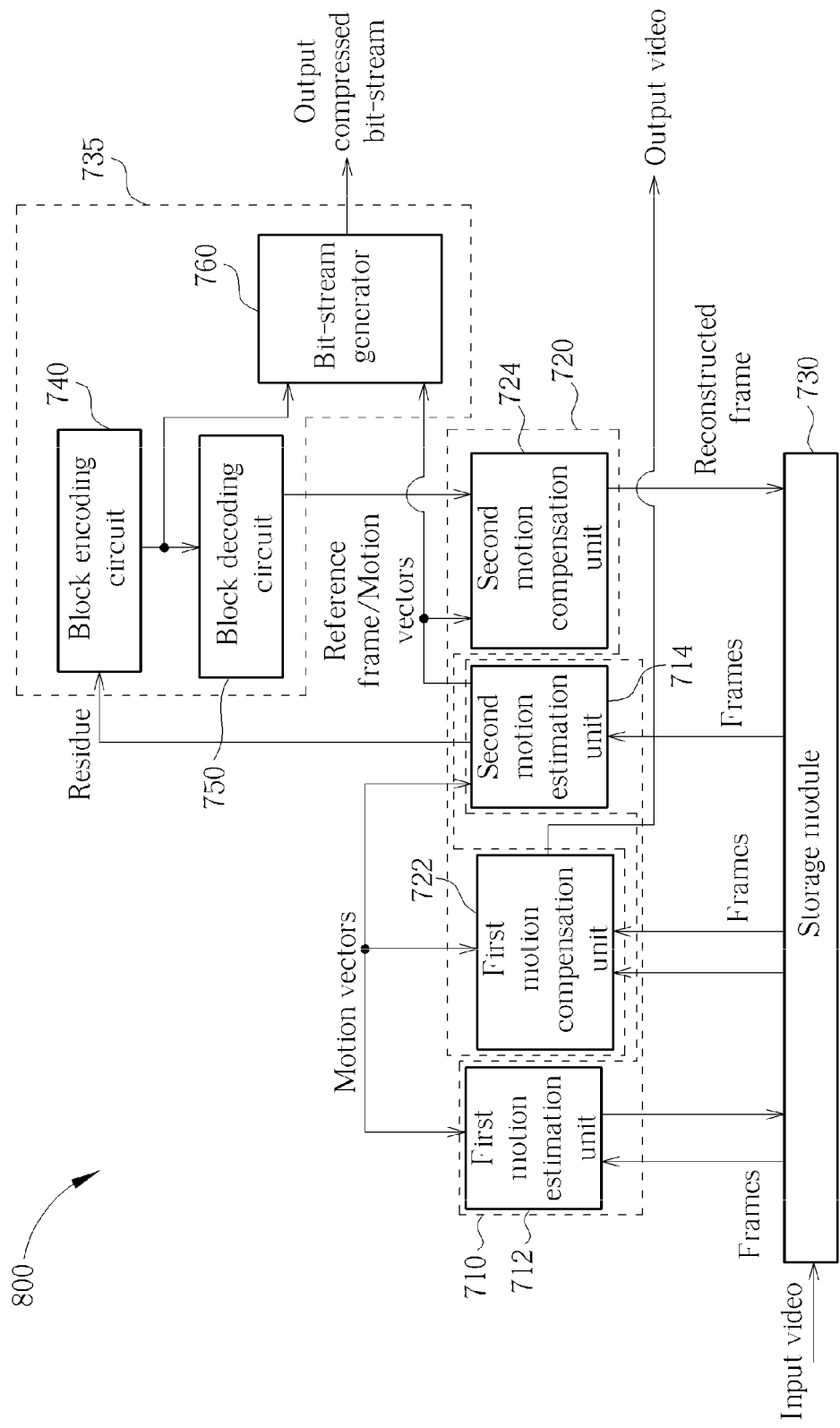
FIG. 8 is a block diagram of a video processing apparatus according to another exemplary embodiment of the present invention.
Figure 9:
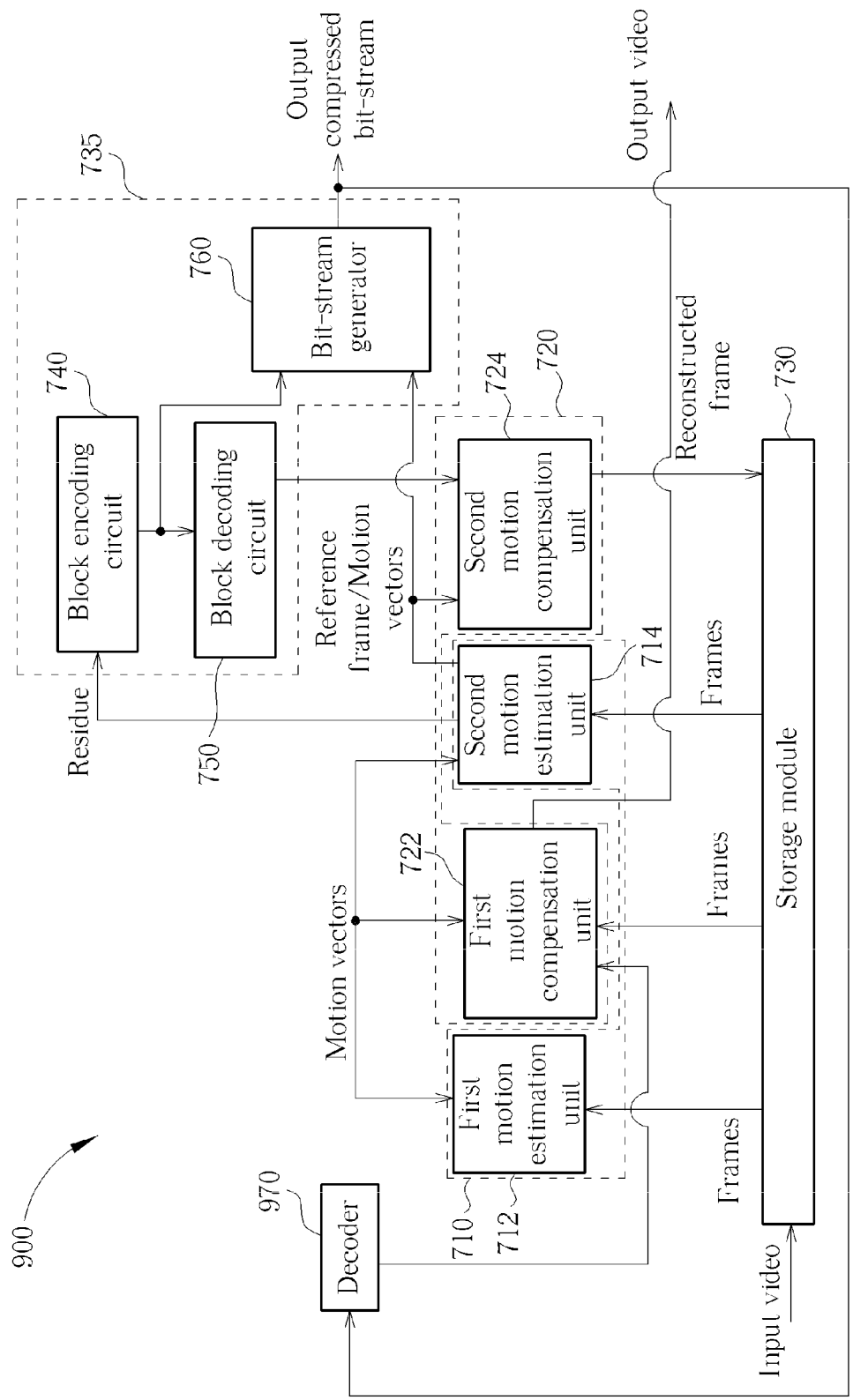
FIG. 9 is a block diagram of a video processing apparatus according to another exemplary embodiment of the present invention.

Similarly, the video processing apparatus 700 can be modified to support functions such as instant replay and rewind. Please refer to FIG. 8 and FIG. 9, which show diagrams of modified video processing apparatuses 800 and 900, respectively. The video processing apparatus 800 stores the motion vectors generated by the motion estimation module 710 (for example, the first motion estimation unit 712) to a storage space or to the storage module 730, and then the first motion compensation unit 722 retrieves proper motion vectors from the storage space or the storage module 730. In FIG. 9, a decoder 970 is added to decode the motion vectors included in the output compressed bit-stream, and provides the motion vectors to the first motion compensation unit 722. As these embodiments have already been detailed in the above, further description is omitted here for brevity.

In summary, in the above-mentioned embodiments, the motion estimation module may share information between the frame rate conversion and the video coding operations such as motion vectors, or share hardware such as a data address generator which extracts frames from the storage module, a block matching (SAD calculation) unit, an on-chip SRAM for caching the search range for block matching, a motion vector generator and storage, or a quarter pair interpolator able to make motion vectors more precise when the motion vector is not an integer. The motion compensation module may share a hardware-like data address generator, an on-chip SRAM for motion compensation, or a quarter-pair interpolator between the frame rate conversion and the video coding. Moreover, the sharing of an I/O interface and first-in-first-out (FIFO) access of the storage module, such as a DRAM, will also benefit the video processing apparatus.

When the video processing apparatus mentioned above is implemented in a TV product, it may support the frame rate conversion, instant replay application, and time shift application at low cost with reduced DRAM bandwidth by storing motion vectors into the storage module or another storage device. The data rate of the motion vectors is only 1% of the video stream, and therefore will not cause interference or performance degradation. When the TV set is in the normal mode, the first motion compensation unit performs the motion judder cancellation to retrieve the current motion vectors; when the TV set is in the delayed playback mode, however, the first motion compensation unit is controlled to retrieve the stored motion vectors.

Furthermore, the sharing concept proposed in the present invention can further extend to combine other functionalities, such as de-interlacing, encoding, video NR, super resolution, and functions that need motion information generated by the motion estimation and motion compensation. The system resource requirement may therefore be reduced.

Figure 10:
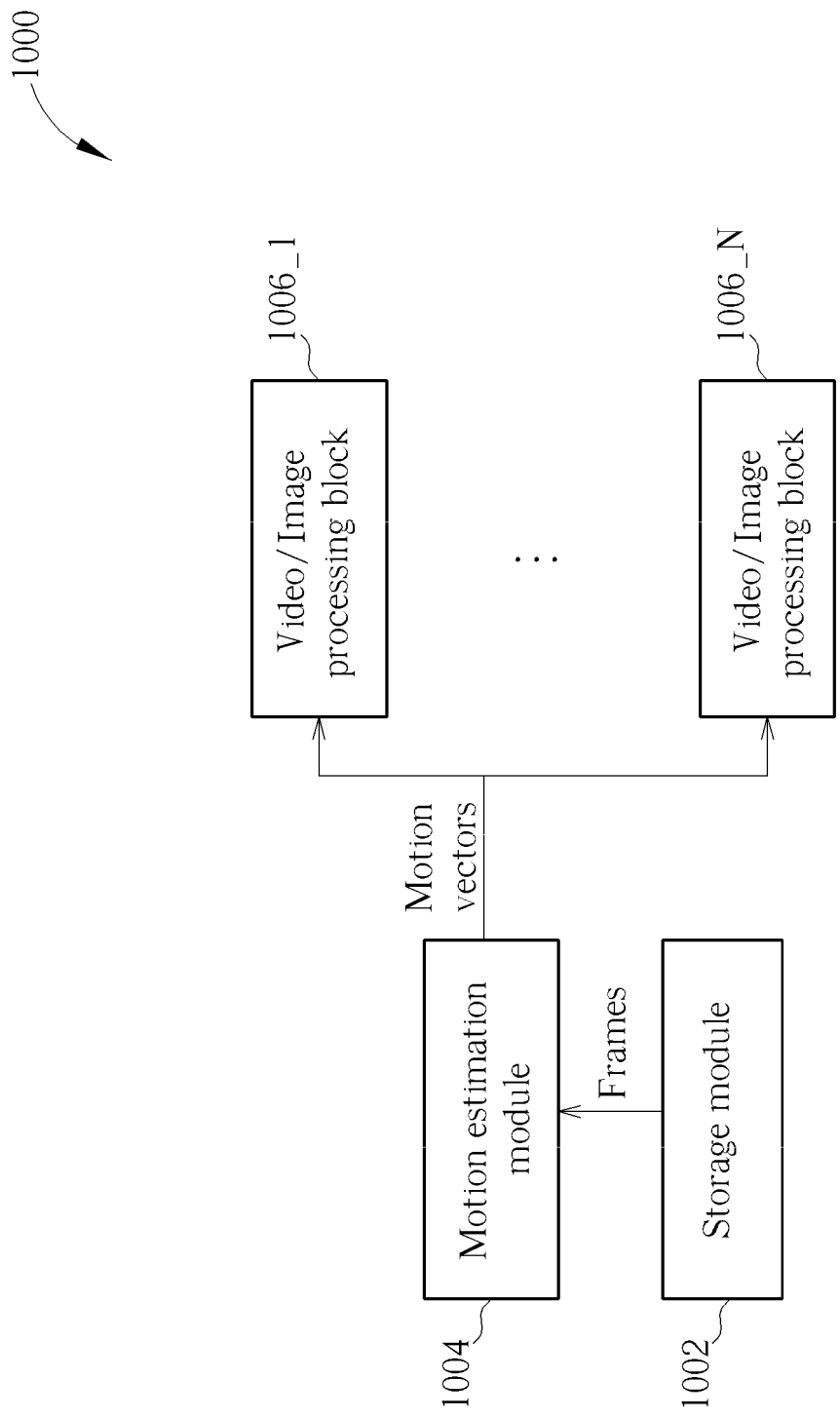
FIG. 10 is a block diagram illustrating a generalized video/image processing apparatus with motion estimation sharing according to an embodiment of the present invention.

More specifically, the motion vectors generated from one motion estimation module may be shared by multiple video/image processing blocks. Please refer to FIG. 10, which is a block diagram illustrating a generalized video/image processing apparatus with motion estimation sharing according to an embodiment of the present invention. By way of example, but not limitation, the exemplary video/image processing apparatus 1000 may be disposed in a television or a mobile phone for video/image processing purposes. As shown in FIG. 10, the exemplary video/image processing apparatus 1000 includes a storage module 1002, a motion estimation module 1004, and a plurality of video/image processing blocks 1006_1-1006_N. The number of video/image processing blocks may be adjusted, depending upon actual design require/consideration. The storage module (e.g., a DRAM) 1002 is used for storing a plurality of images. In one exemplary design, the images may be derived from an interlaced video source. Hence, the images are composed of odd fields and even fields of an interlaced video stream. In another exemplary design, the images may be derived from a progressive video source. Hence, the images are composed of frames of a progressive video stream. In yet another exemplary design, the images may be derived from an image source. Hence, the images are composed of pictures of an image input. The motion estimation module 1004 is coupled to the storage module 1002, and used for retrieving the images from the storage module 1002 and generating motion vectors according to the retrieved images. For example, the motion estimation module 1004 may employ one of the above-mentioned 3DRS algorithm or Full search algorithm for estimating the motion vectors. The video/image processing blocks 1006_1-1006_N are coupled to the motion estimation module 1004, and used for performing a plurality of different video/image processing operations, respectively. As can be seen from FIG. 10, the same motion estimation module 1004 is shared by different video/image processing blocks 1006_1-1006_N. Hence, each of the video/image processing blocks 1006-1-1006_N is arranged for receiving the motion vectors generated from the motion estimation module 1004, and referring to the received motion vectors to perform a designated video/image processing operation. With a hardware sharing technique employed by the video/image processing apparatus 1000, the motion vectors required by multiple video/image processing blocks 1006_1-1006_N are provided by the same motion estimation module 1004. In this way, the production cost can be effectively reduced.

By way of example, but not limitation, the video/image processing operations performed by the video/image processing blocks 1006_1-1006_N may include frame rate conversion, video decoding, noise reduction, deinterlacing, super resolution processing, video stabilization, multi-frame image noise reduction, camera stabilization, high dynamic range (HDR) processing, and/or rolling-shutter reduction. For better understanding of the technical features of the present invention, several examples based on the motion estimation sharing configuration shown in FIG. 10 are detailed as below.

Figure 11:
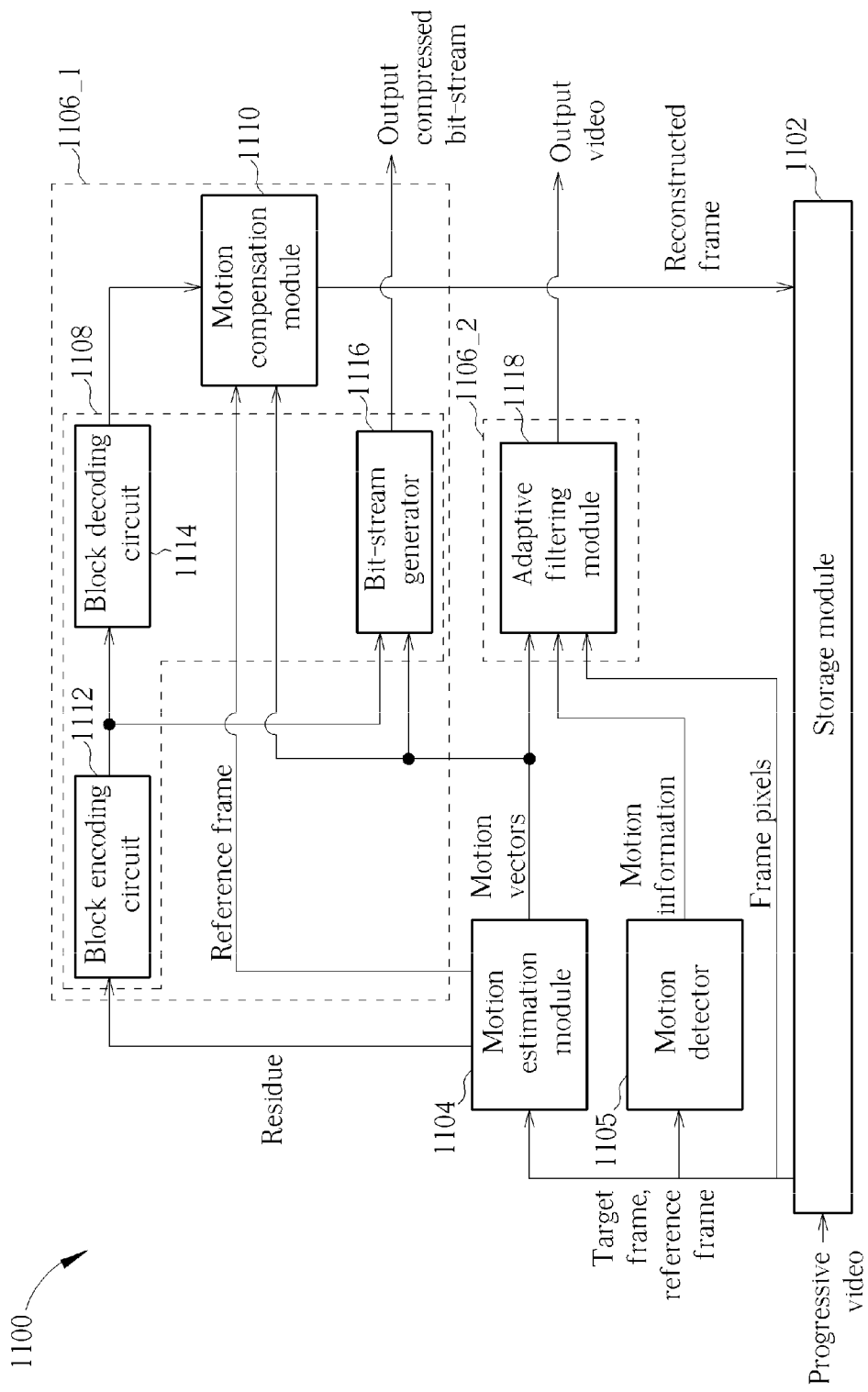
FIG. 11 is a block diagram of a video processing apparatus according to an exemplary embodiment of the present invention.

FIG. 11 is a block diagram of a video processing apparatus according to an exemplary embodiment of the present invention. The video processing apparatus 1100 employs the motion estimation sharing configuration shown in FIG. 10, and therefore has a storage module 1102, a motion estimation module 1104, and a plurality of video processing blocks 1106_1, 1106_2. The storage module 1102 is used to store frames derived from a progressive video input. The video processing block 1106_1 includes a video coding module 1108 and a motion compensation module 1110, wherein the video coding module 1108 includes a block encoding circuit 1112, a block decoding circuit 1114 and a bit-stream generator 1116. The video processing block 1106_2 is implemented using an adaptive filtering module 1118. Besides, the adaptive filtering module 1118 may receive motion information provided by a motion detector 1105.

In this embodiment, the motion estimation module 1104 retrieves a target frame and a reference frame from the storage module 1102, and generates motion vectors and a residue according to the target frame and the reference frame, where the residue is transmitted to the block encoding circuit 1112, and the motion vectors are transmitted to the adaptive filtering module 1118, the bit-stream generator 1116, and the motion compensation module 1110. The block encoding circuit 1112 encodes the residue to generate an encoded residue, and transmits the encoded residue to the bit-stream generator 1116 and the block decoding circuit 1114. The bit-stream generator 1116 generates the output compressed bit-stream according to the motion vectors and the encoded residue. Additionally, after the decoding of the encoded residue is accomplished by the block decoding circuit 1108, the processed residue along with the motion vectors and the reference frame are processed by the motion compensation module 1110 to generate a reconstructed frame, which is stored back into the storage module 1102. To put it simply, the video coding module 1108 is used for encoding frames to generate a compressed bit-stream according to motion vectors generated from the motion estimation module 1104, and the motion compensation module 1110 is used for generating a reconstructed frame according to one of the frames (e.g., the reference frame) and the motion vectors, and storing the reconstructed frame into the storage module 1102.

In this embodiment, the motion estimation module 1104 is also shared by the adaptive filtering module 1118, which is used for performing motion compensated video noise reduction according to the motion vectors and the frame pixels. It should be noted, in a case where the motion estimation module 1104 is unable to provide accurate motion vectors, the adaptive filtering module 1118 may refer to the motion information provided by the motion detector 1105 for performing the motion compensated video noise reduction. However, this is for illustrative purposes only, and is not meant to be a limitation of the present invention. In other words, the motion detector 1105 may be an optional element. With the use of the adaptive filtering module 1118, an output video with reduced noise is generated.

Figure 12:
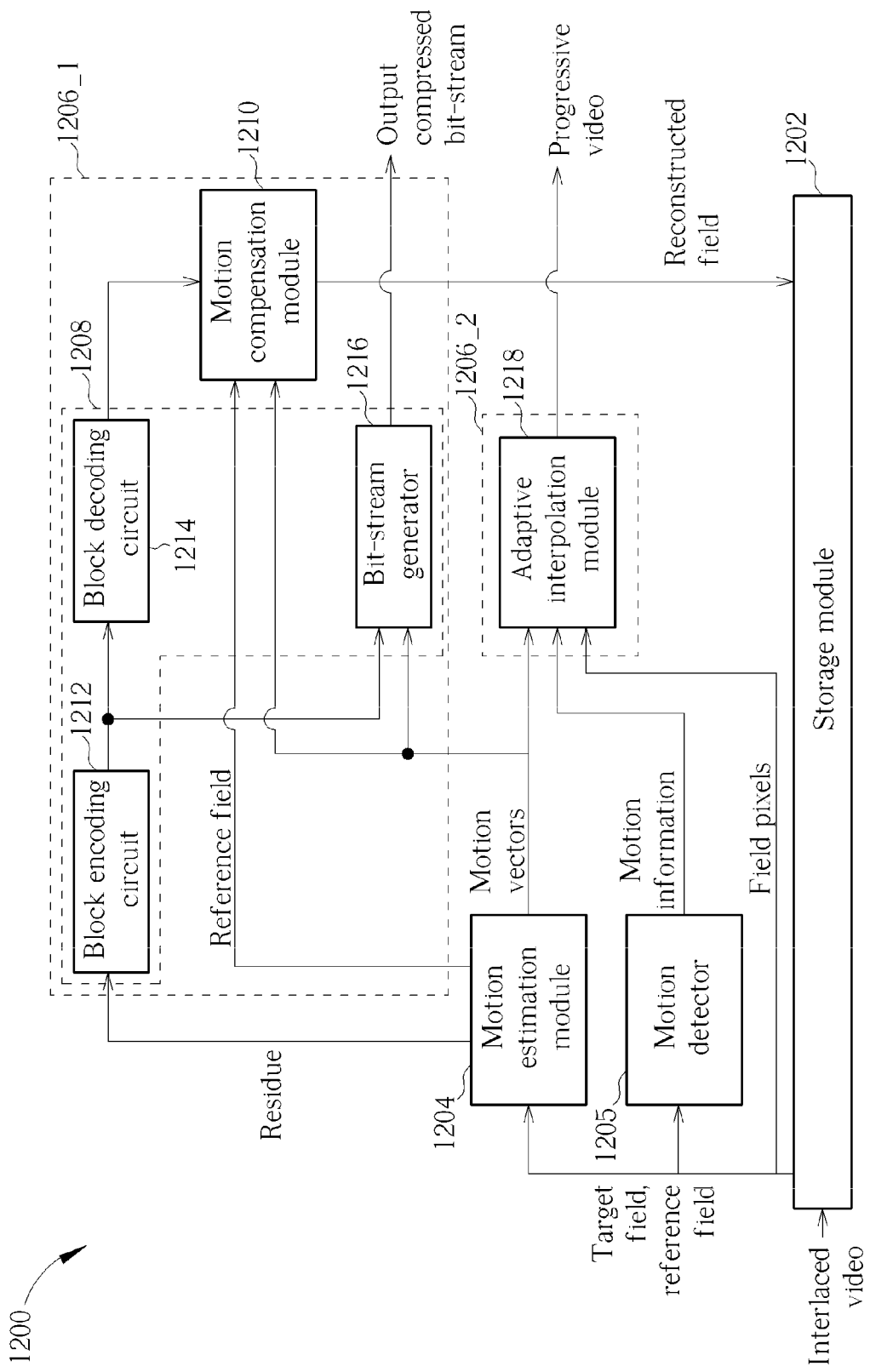
FIG. 12 is a block diagram of a video processing apparatus according to another exemplary embodiment of the present invention.

FIG. 12 is a block diagram of a video processing apparatus according to another exemplary embodiment of the present invention. The video processing apparatus 1200 employs the motion estimation sharing configuration shown in FIG. 10, and therefore has a storage module 1202, a motion estimation module 1204, and a plurality of video processing blocks 1206_1, 1206_2. The storage module 1202 is used to store odd fields and even fields derived from an interlaced video input. The video processing block 1206_1 includes a video coding module 1208 and a motion compensation module 1210, wherein the video coding module 1208 includes a block encoding circuit 1212, a block decoding circuit 1214 and a bit-stream generator 1216. The video processing block 1206_2 is implemented using an adaptive interpolation module 1218. Besides, the adaptive filtering module 1218 may receive motion information provided by a motion detector 1205.

The operation of the video processing block 1206_1 in FIG. 12 is similar to that of the video processing block 1106_1 in FIG. 11. However, as the video source of the video processing apparatus 1200 provides an interlaced video stream, the video processing block 1206_1 is used for processing odd/even fields rather than frames. Similarly, operations of the motion estimation module 1204 and motion detector 1205 in FIG. 12 are similar to that of the motion estimation module 1104 and motion detector 1105 in FIG. 11, and the major difference is that the motion estimation module 1204 and motion detector 1205 are used for processing odd/even fields rather than frames. For example, the motion estimation module 1204 is arranged to detect field motion, while the motion estimation module 1104 is arranged to detect frame motion. As a person skilled in the art can readily understand field-based operations performed by the elements in FIG. 12 after reading above paragraphs directed to the frame-based operations performed by the elements in FIG. 11, further description is omitted here for brevity.

In this embodiment, the motion estimation module 1204 is also shared by the adaptive interpolation module 1218, which is used for performing motion compensated video deinterlacing according to the motion vectors and the field pixels. It should be noted that the adaptive interpolation module 1218 may refer to the motion information provided by the motion detector 1205 for performing the motion compensated video deinterlacing when the motion estimation module 1204 is unable to provide accurate motion vectors. However, this is for illustrative purposes only, and is not meant to be a limitation of the present invention. In other words, the motion detector 1205 may be an optional element. With the use of the adaptive interpolation module 1218, each odd field composed of odd scan lines is converted into a frame by adding interpolated even scan lines to the odd field, and each even field composed of even scan lines is converted into a frame by adding interpolated odd scan lines to the even field.

Figure 13:
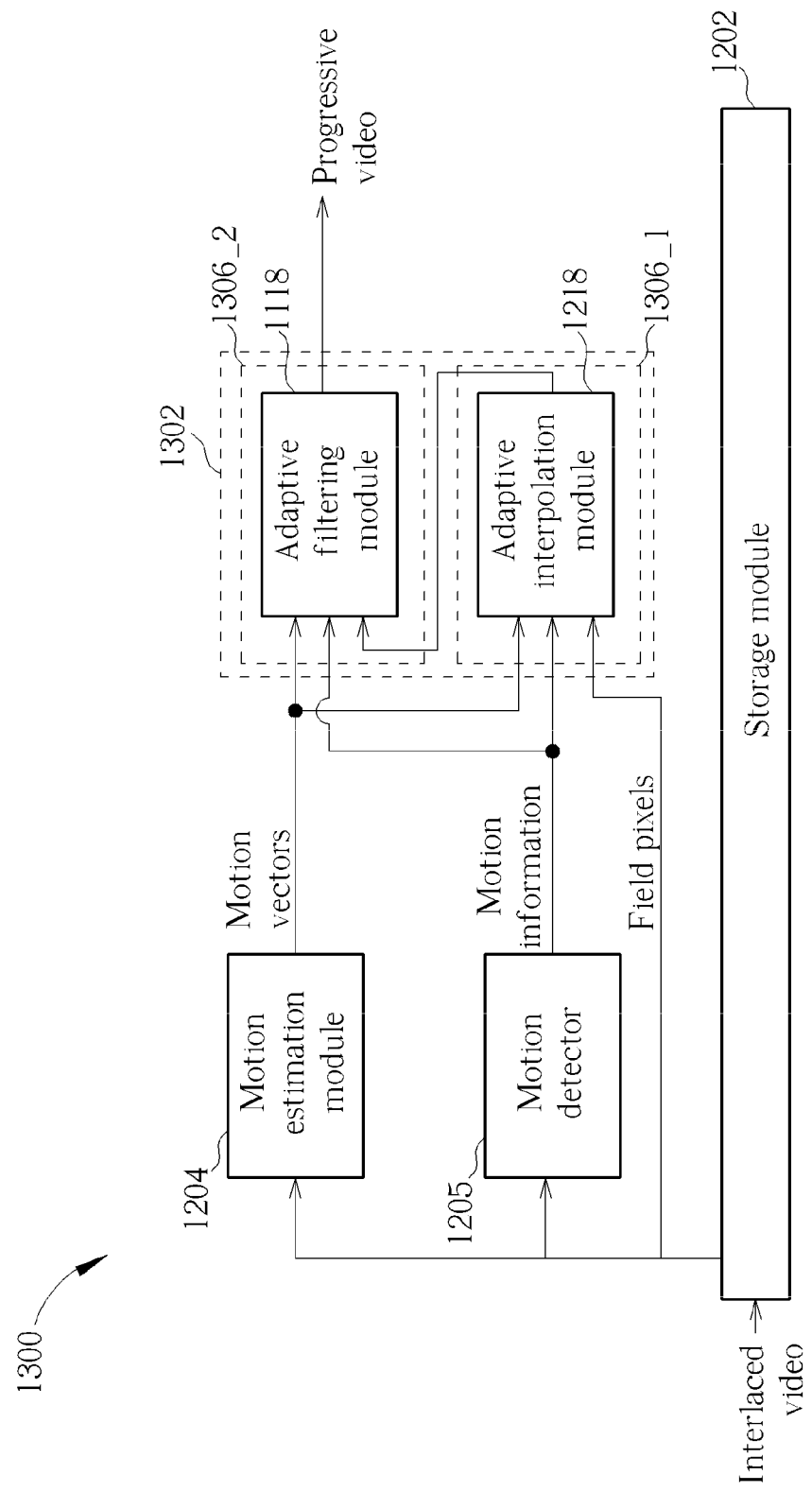
FIG. 13 is a block diagram of a video processing apparatus according to another exemplary embodiment of the present invention.

FIG. 13 is a block diagram of a video processing apparatus according to another exemplary embodiment of the present invention. The video processing apparatus 1300 has a joint processing system 1302 including a plurality of video processing blocks 1306_1 and 1306_2. The video processing apparatus 1300 employs the motion estimation sharing configuration shown in FIG. 10, and therefore has the aforementioned storage module 1202 and motion estimation module 1204, and a plurality of video processing blocks 1306_1 and 1306_2, where the video processing block 1306_1 is implemented using the aforementioned adaptive interpolation module 1218, and the video processing block 1306_2 is implemented using the aforementioned adaptive filtering module 1118. By way of example, but not limitation, the frame pixels to be processed by the adaptive filtering module 1118 for motion compensated noise reduction are derived from a motion compensated video deinterlacing output of the adaptive interpolation module 1218. Besides, as mentioned above, the adaptive interpolation module 1218 may receive the motion information generated from the optional motion detector 1205. As a person skilled in the art can readily understand details of the video processing apparatus 1300 after reading above paragraphs, further description is omitted here for brevity.

Figure 14:
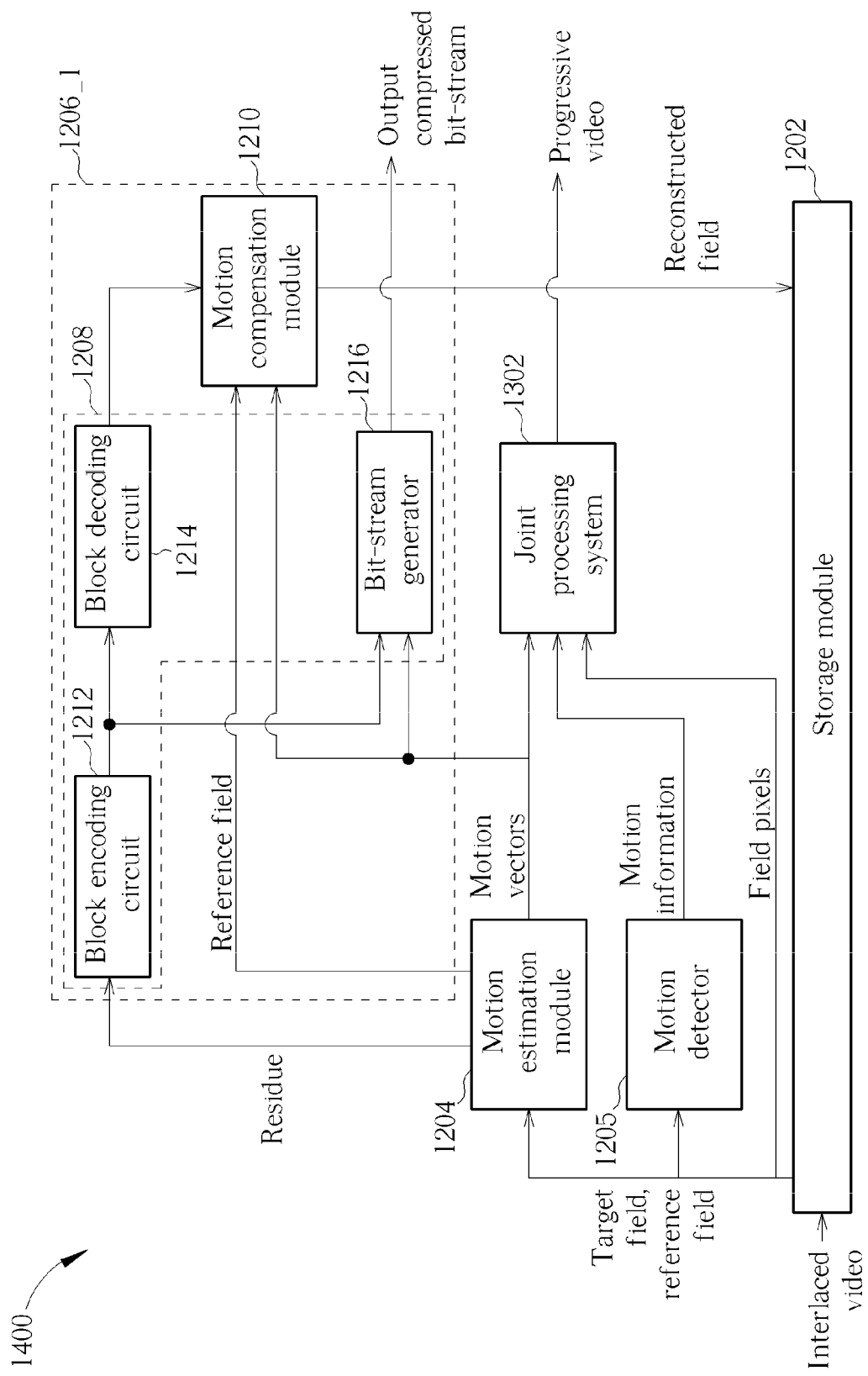
FIG. 14 is a block diagram of a video processing apparatus according to another exemplary embodiment of the present invention.

FIG. 14 is a block diagram of a video processing apparatus according to another exemplary embodiment of the present invention. The video processing apparatus 1400 employs the motion estimation sharing configuration shown in FIG. 10, and therefore has the aforementioned storage module 1202, motion estimation module 1204, video processing block 1206_1, and additional video processing blocks (e.g., 1306_1 and 1306_2) implemented in the joint processing system 1302. As a person skilled in the art can readily understand details of the video processing apparatus 1400 after reading above paragraphs, further description is omitted here for brevity.

Figure 15:
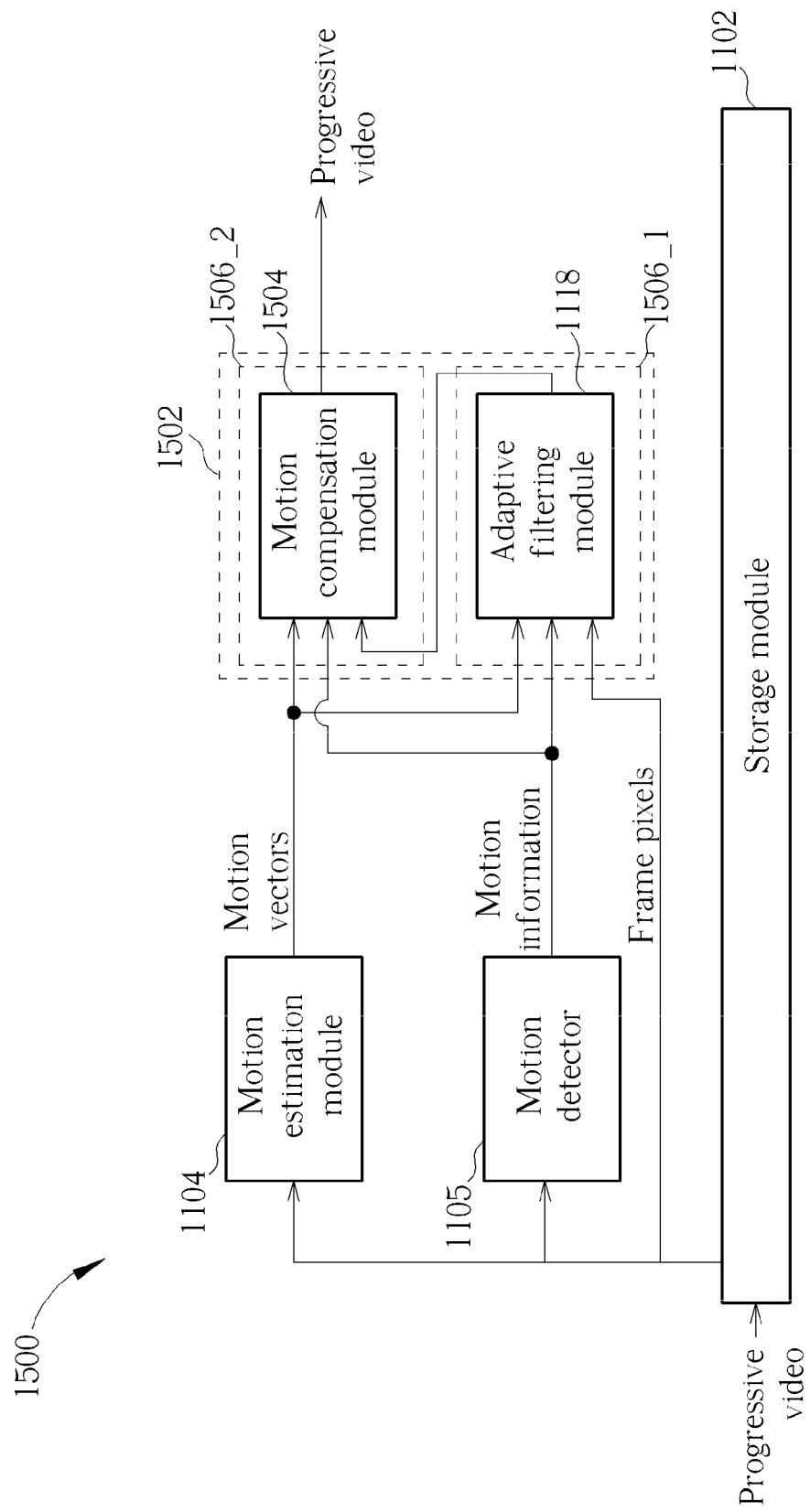
FIG. 15 is a block diagram of a video processing apparatus according to another exemplary embodiment of the present invention.

FIG. 15 is a block diagram of a video processing apparatus according to another exemplary embodiment of the present invention. The video processing apparatus 1500 has a joint processing system 1502 including a plurality of video processing blocks 1506_1 and 1506_2. The video processing apparatus 1500 employs the motion estimation sharing configuration shown in FIG. 10, and therefore has the storage module 1102, the motion estimation module 1104 and the video processing blocks 1506_1, 1506_2. The video processing block 1506_1 is implemented using the aforementioned adaptive filtering module 1118, which may also receive motion information from the optional motion detector 1105. Regarding the video processing block 1306_2, it is implemented using a motion compensation module 1504, which is arranged for performing frame rate conversion with motion judder cancellation (MJC) according to the motion vectors generated from the motion estimation module 1104, and accordingly generating interpolated frame(s). By way of example, but not limitation, the frame pixels to be processed by the motion compensation module 1504 for frame rate conversion are derived from a motion compensated video noise reduction output of the adaptive filtering module 1118. With the use of the motion compensation module 1504 and the adaptive filtering module 1118, an output progressive video with higher frame rate as well as reduced noise may be generated. As a person skilled in the art can readily understand details of the video processing apparatus 1500 after reading above paragraphs, further description is omitted here for brevity.

Figure 16:
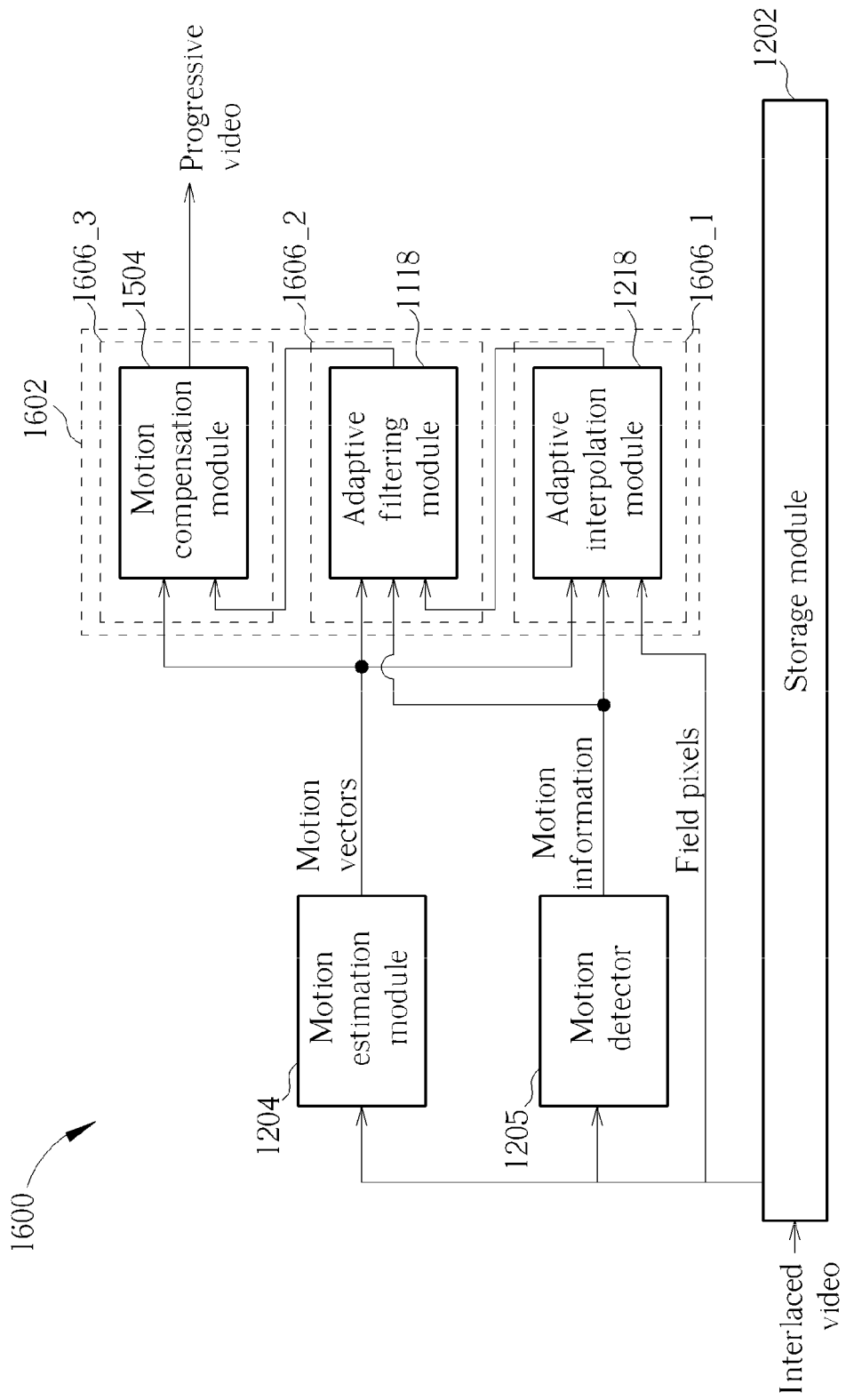
FIG. 16 is a block diagram of a video processing apparatus according to another exemplary embodiment of the present invention.

FIG. 16 is a block diagram of a video processing apparatus according to another exemplary embodiment of the present invention. The video processing apparatus 1600 has a joint processing system 1602 including a plurality of video processing blocks 1606_1, 1606_2 and 1606_3. The video processing apparatus 1600 employs the motion estimation sharing configuration shown in FIG. 10, and therefore has the storage module 1202, the motion estimation module 1204 and the video processing blocks 1606_1-1606_3. The video processing block 1606_1 is implemented using the aforementioned adaptive interpolation module 1218, which may also receive motion information from the optional motion detector 1205. The video processing block 1606_2 is implemented using the aforementioned adaptive filtering module 1118, which may also receive motion information from the optional motion detector 1205. The video processing block 1606_3 is implemented using the aforementioned motion compensation module 1504. By way of example, but not limitation, the frame pixels to be processed by the motion compensation module 1504 for frame rate conversion are derived from a motion compensated video noise reduction output of the adaptive filtering module 1118, and the frame pixels to be processed by the adaptive filtering module 1118 for motion compensated noise reduction are derived from a motion compensated video deinterlacing output of the adaptive interpolation module 1218. As a person skilled in the art can readily understand details of the video processing apparatus 1600 after reading above paragraphs, further description is omitted here for brevity.

Figure 17:
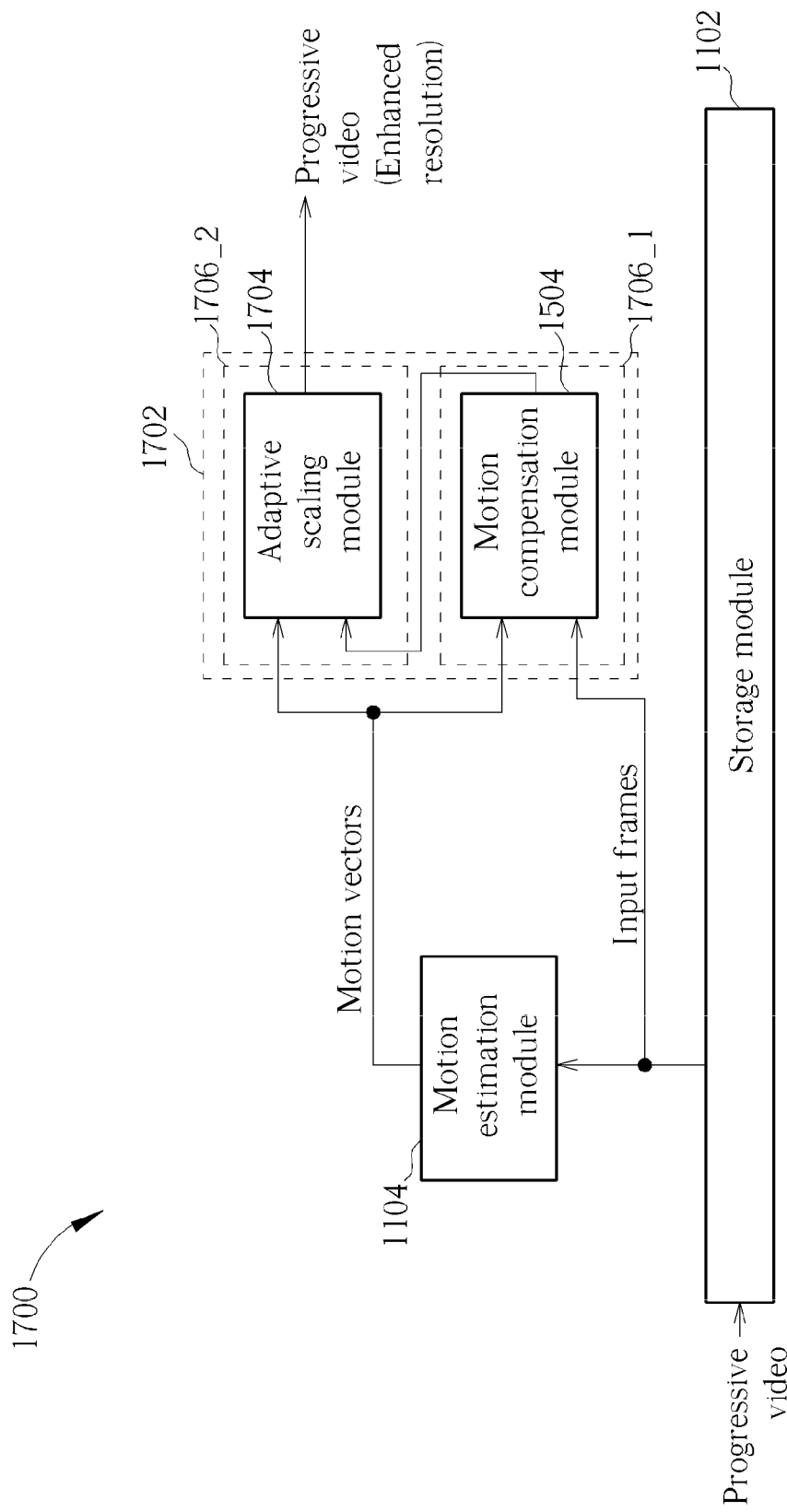
FIG. 17 is a block diagram of a video processing apparatus according to another exemplary embodiment of the present invention.

FIG. 17 is a block diagram of a video processing apparatus according to another exemplary embodiment of the present invention. The video processing apparatus 1700 has a joint processing system 1702 including a plurality of video processing blocks 1706_1 and 1706_2. The video processing apparatus 1700 employs the motion estimation sharing configuration shown in FIG. 10, and therefore has the aforementioned storage module 1102 and motion estimation module 1104, and a plurality of video processing blocks 1706_1 and 1706_2. The video processing block 1706_1 is implemented using the aforementioned motion compensation module 1504. The video processing block 1706_2 is implemented using an adaptive scaling module 1704, which is arranged for performing multi-frame super resolution processing according to the motion vectors generated from the motion estimation module 1104. By way of example, but not limitation, the frame pixels to be processed by the adaptive scaling module 1704 for resolution enhancement are derived from a frame rate conversion output of the motion compensation module 1504. With the use of the motion compensation module 1504 and the adaptive scaling module 1704, a progressive video output with higher frame rate as well as higher resolution is generated. For example, the progressive video input may have a standard-definition (SD) resolution, and the progressive video output may have a high-definition (HD) resolution.

Figure 18:
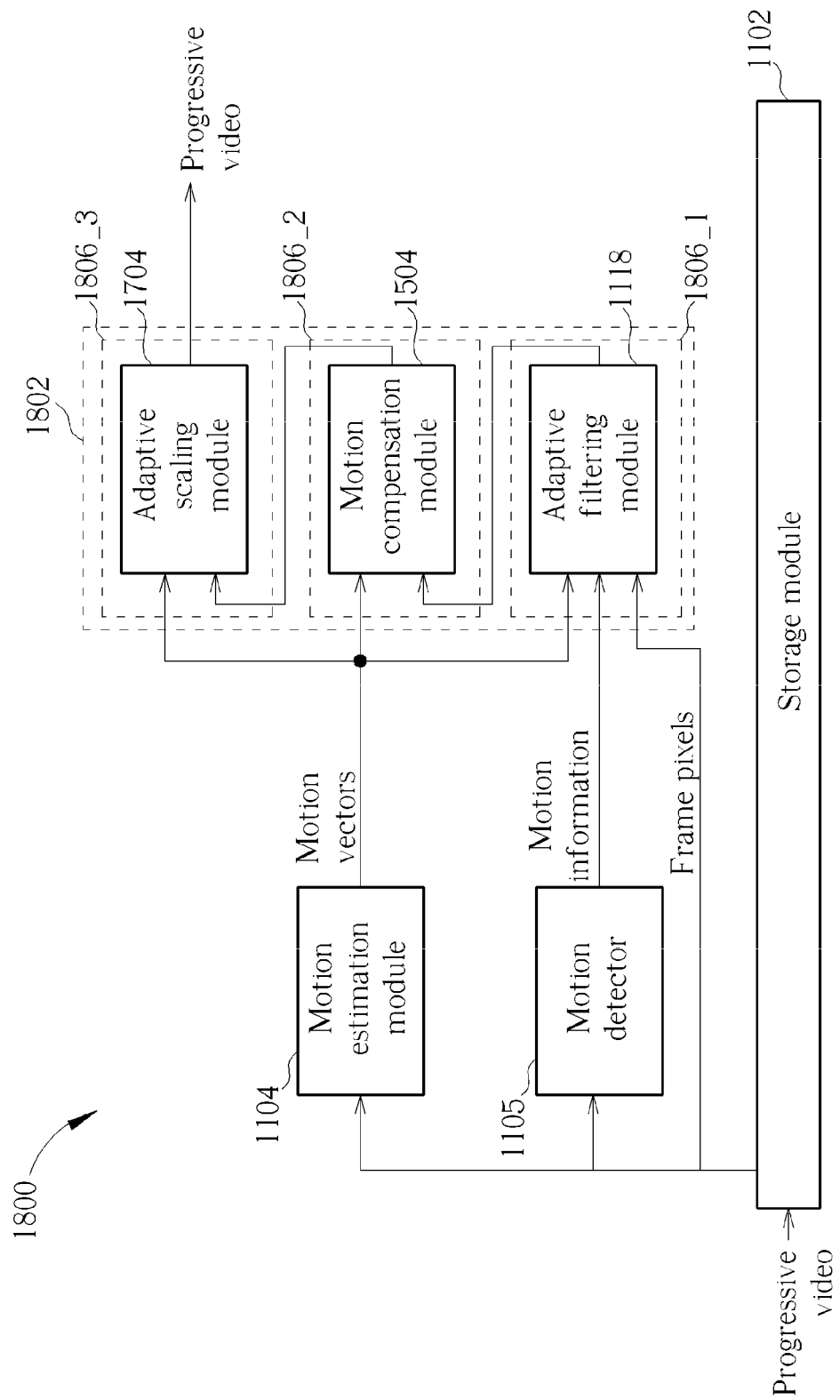
FIG. 18 is a block diagram of a video processing apparatus according to another exemplary embodiment of the present invention.

FIG. 18 is a block diagram of a video processing apparatus according to another exemplary embodiment of the present invention. The video processing apparatus 1800 has a joint processing system 1802 including a plurality of video processing blocks 1806_1, 1806_2 and 1806_3. The video processing apparatus 1800 employs the motion estimation sharing configuration shown in FIG. 10, and therefore has the storage module 1102, the motion estimation module 1104 and the video processing blocks 1806_1-1806_3. The video processing block 1806_1 is implemented using the aforementioned adaptive filtering module 1118, which may also receive motion information from the optional motion detector 1105. The video processing block 1806_2 is implemented using the aforementioned motion compensation module 1504. The video processing block 1806_3 is implemented using the aforementioned adaptive scaling module 1704. By way of example, but not limitation, the frame pixels to be processed by the adaptive scaling module 1704 for resolution enhancement are derived from a frame rate conversion output of the motion compensation module 1504, and the frame pixels to be processed by the motion compensation module 1504 for frame rate conversion are derived from a motion compensated video noise reduction output of the adaptive filtering module 1118. In this way, a progressive video output with higher resolution, higher frame rate and reduced noise is generated. As a person skilled in the art can readily understand details of the video processing apparatus 1800 after reading above paragraphs, further description is omitted here for brevity.

Figure 19:
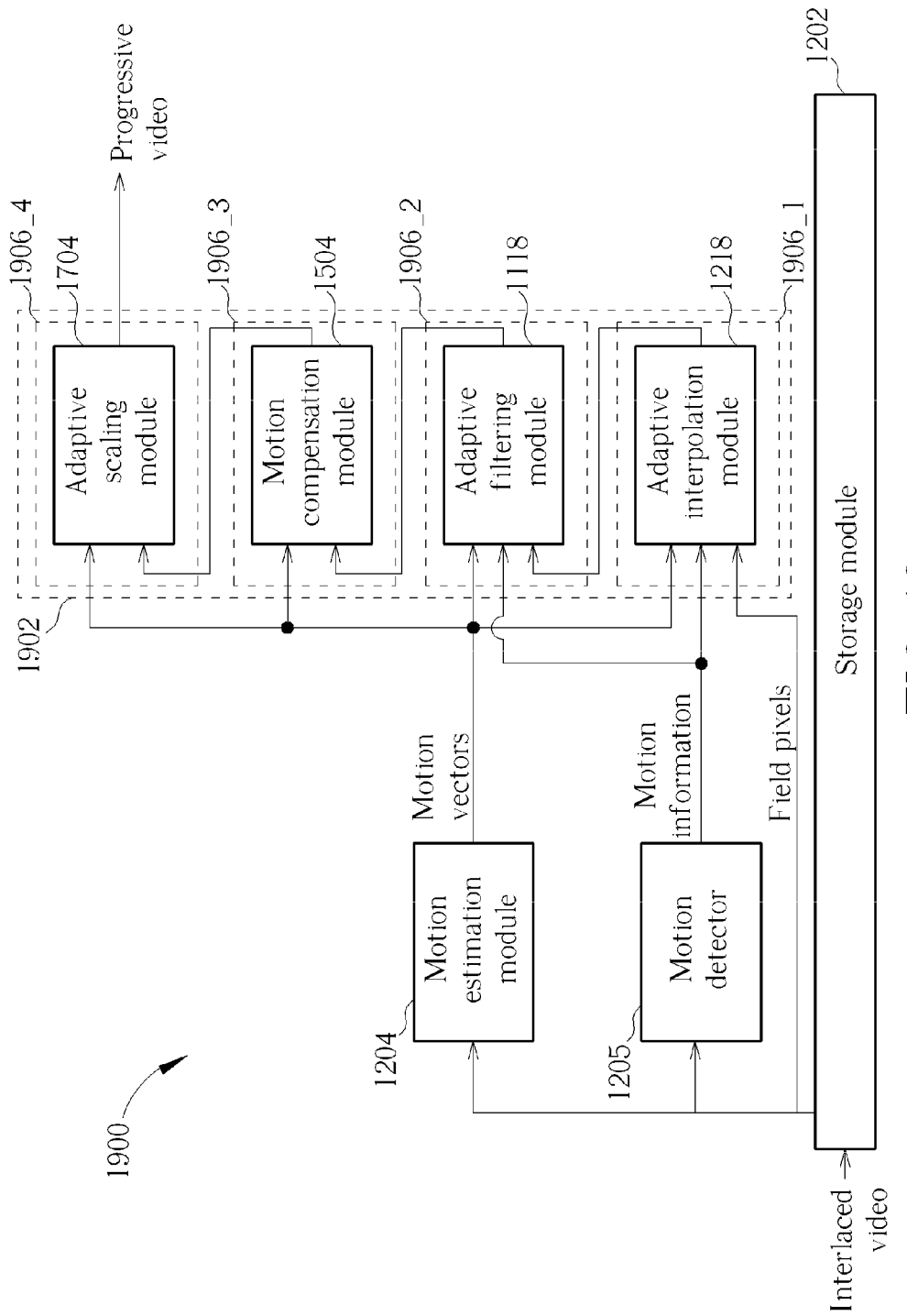
FIG. 19 is a block diagram of a video processing apparatus according to another exemplary embodiment of the present invention.

FIG. 19 is a block diagram of a video processing apparatus according to another exemplary embodiment of the present invention. The video processing apparatus 1900 has a joint processing system 1902 including a plurality of video processing blocks 1906_1, 1906_2, 1906_3 and 1906_4. The video processing apparatus 1900 employs the motion estimation sharing configuration shown in FIG. 10, and therefore has the storage module 1202, the motion estimation module 1204 and the video processing blocks 1906_1-1906_4. The video processing block 1906_1 is implemented using the aforementioned adaptive interpolation module 1218, which may also receive motion information from the optional motion detector 1205. The video processing block 1906_2 is implemented using the aforementioned adaptive filtering module 1118, which may also receive motion information from the optional motion detector 1105. The video processing block 1906_3 is implemented using the aforementioned motion compensation module 1504. The video processing block 1906_4 is implemented using the aforementioned adaptive scaling module 1704. By way of example, but not limitation, the frame pixels to be processed by the adaptive scaling module 1704 for resolution enhancement are derived from a frame rate conversion output of the motion compensation module 1504, the frame pixels to be processed by the motion compensation module 1504 for frame rate conversion are derived from a motion compensated video noise reduction output of the adaptive filtering module 1118, and the frame pixels to be processed by the adaptive filtering module 1118 are derived from a video deinterlacing output of the adaptive interpolation module 1218. As a person skilled in the art can readily understand details of the video processing apparatus 1900 after reading above paragraphs, further description is omitted here for brevity.

Figure 20:
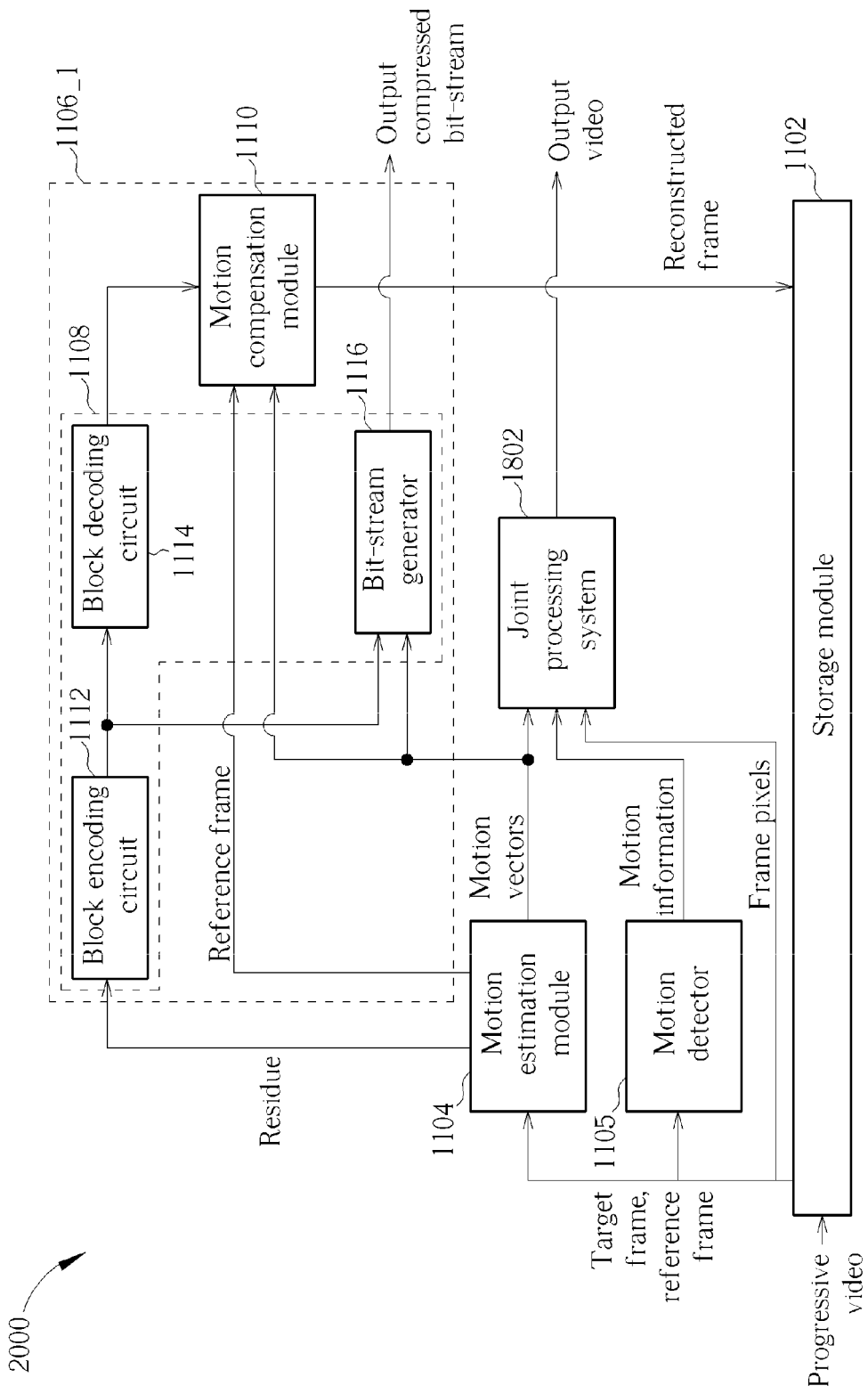
FIG. 20 is a block diagram of a video processing apparatus according to another exemplary embodiment of the present invention.

FIG. 20 is a block diagram of a video processing apparatus according to another exemplary embodiment of the present invention. The video processing apparatus 2000 employs the motion estimation sharing configuration shown in FIG. 10, and therefore has the storage module 1102, the motion estimation module 1104, the video processing block 1106_1, and additional video processing blocks (e.g., 1806_1-1806_3) implemented in the joint processing system 1802. As a person skilled in the art can readily understand details of the video processing apparatus 2000 after reading above paragraphs, further description is omitted here for brevity.

Figure 21:
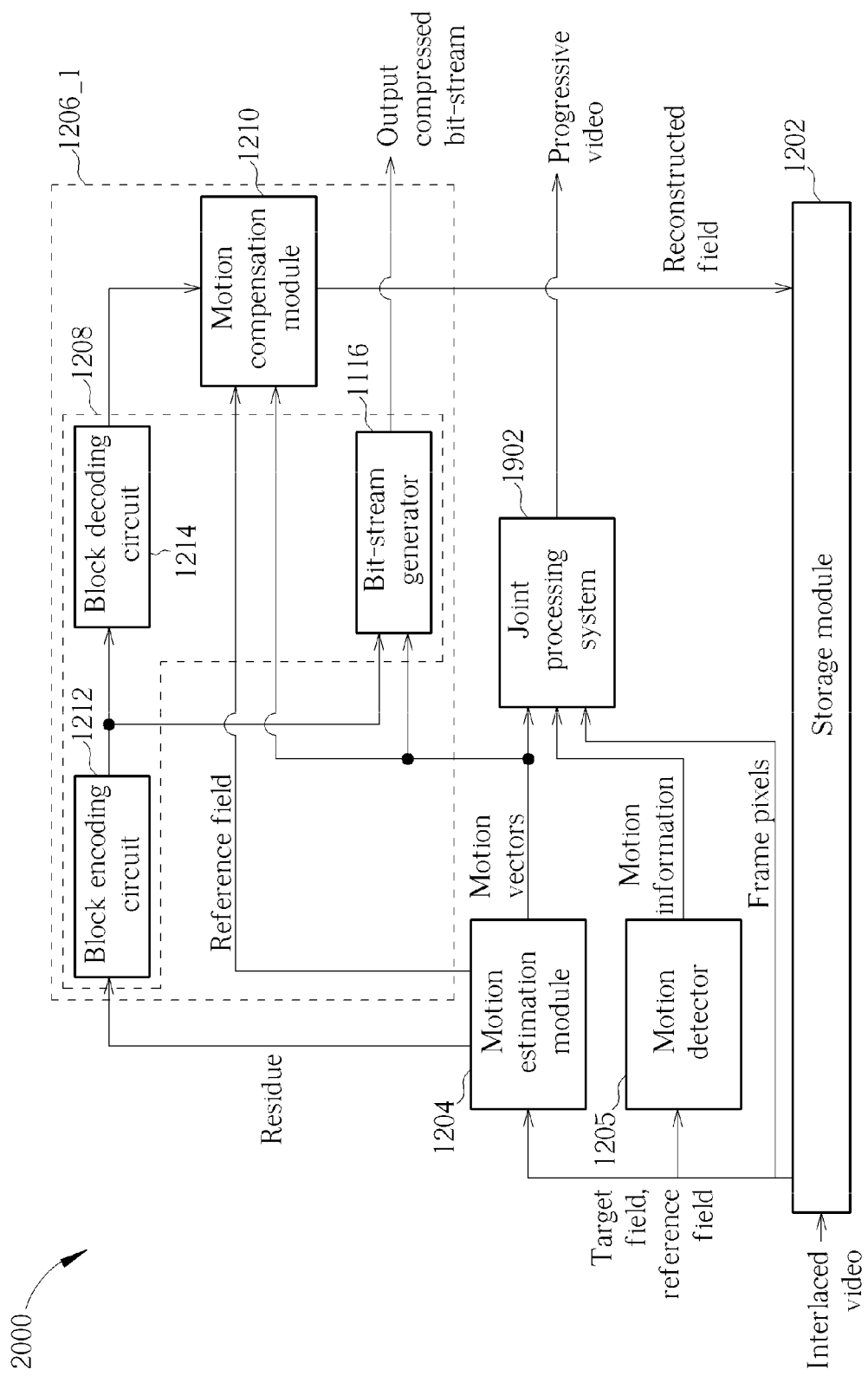
FIG. 21 is a block diagram of a video processing apparatus according to another exemplary embodiment of the present invention.

FIG. 21 is a block diagram of a video processing apparatus according to another exemplary embodiment of the present invention. The video processing apparatus 2100 employs the motion estimation sharing configuration shown in FIG. 10, and therefore has the storage module 1202, the motion estimation module 1204, the video processing block 1206_1, and additional video processing blocks (e.g., 1906_1-1906_4) implemented in the joint processing system 1902. As a person skilled in the art can readily understand details of the video processing apparatus 2100 after reading above paragraphs, further description is omitted here for brevity.

Figure 22:
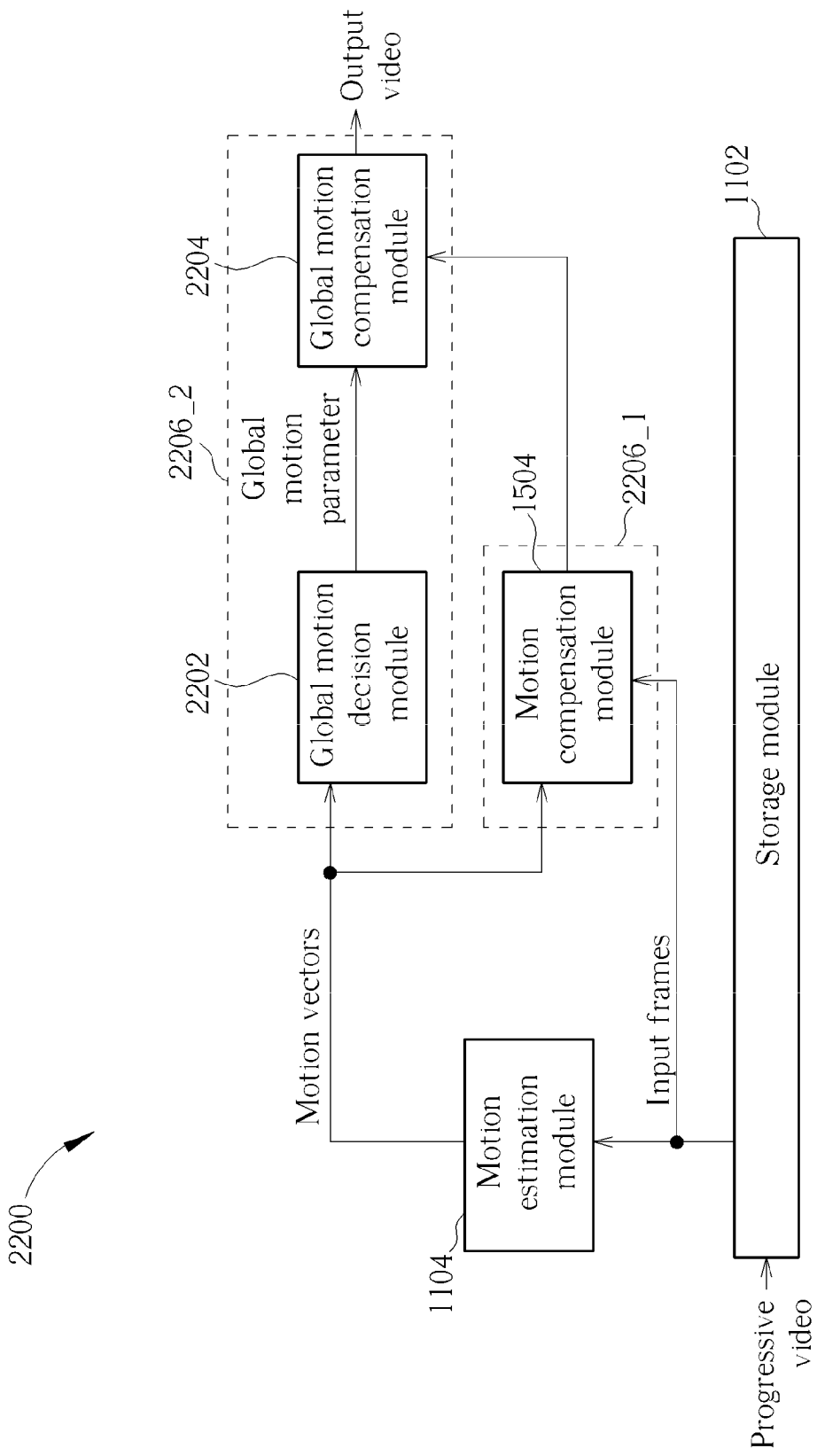
FIG. 22 is a block diagram of a video processing apparatus according to another exemplary embodiment of the present invention.

FIG. 22 is a block diagram of a video processing apparatus according to another exemplary embodiment of the present invention. The video processing apparatus 2200 employs the motion estimation sharing configuration shown in FIG. 10, and therefore has the aforementioned storage module 1102 and motion estimation module 1104, and a plurality of video processing blocks 2206_1 and 2206_2. The video processing block 2206_1 is implemented using the aforementioned motion compensation module 1504. Regarding the video processing block 2206_2, it includes a global motion decision module 2202 and a global motion compensation module 2204. The global motion decision module 2202 is used for generating a global motion parameter according to the motion vectors generated from the motion estimation module 1104. For example, the global motion decision module 2202 derives motion vector statistics from analyzing the motion vectors generated from the motion estimation module 1104, and then sets the global motion parameter in response to the global motion determined according to the motion vector statistics. The global motion compensation module 2204 is used for performing video stabilization according to the global motion parameter. By way of example, but not limitation, the frame pixels to be processed by the global motion compensation module 2204 for stabilizing the video contents presented by the output video are derived from a frame rate conversion output of the motion compensation module 1504. With the use of the motion compensation module 1504, the global motion decision module 2202 and the global motion compensation module 2204, an output video with stabilized frame contents at a higher frame rate is generated.

Figure 23:
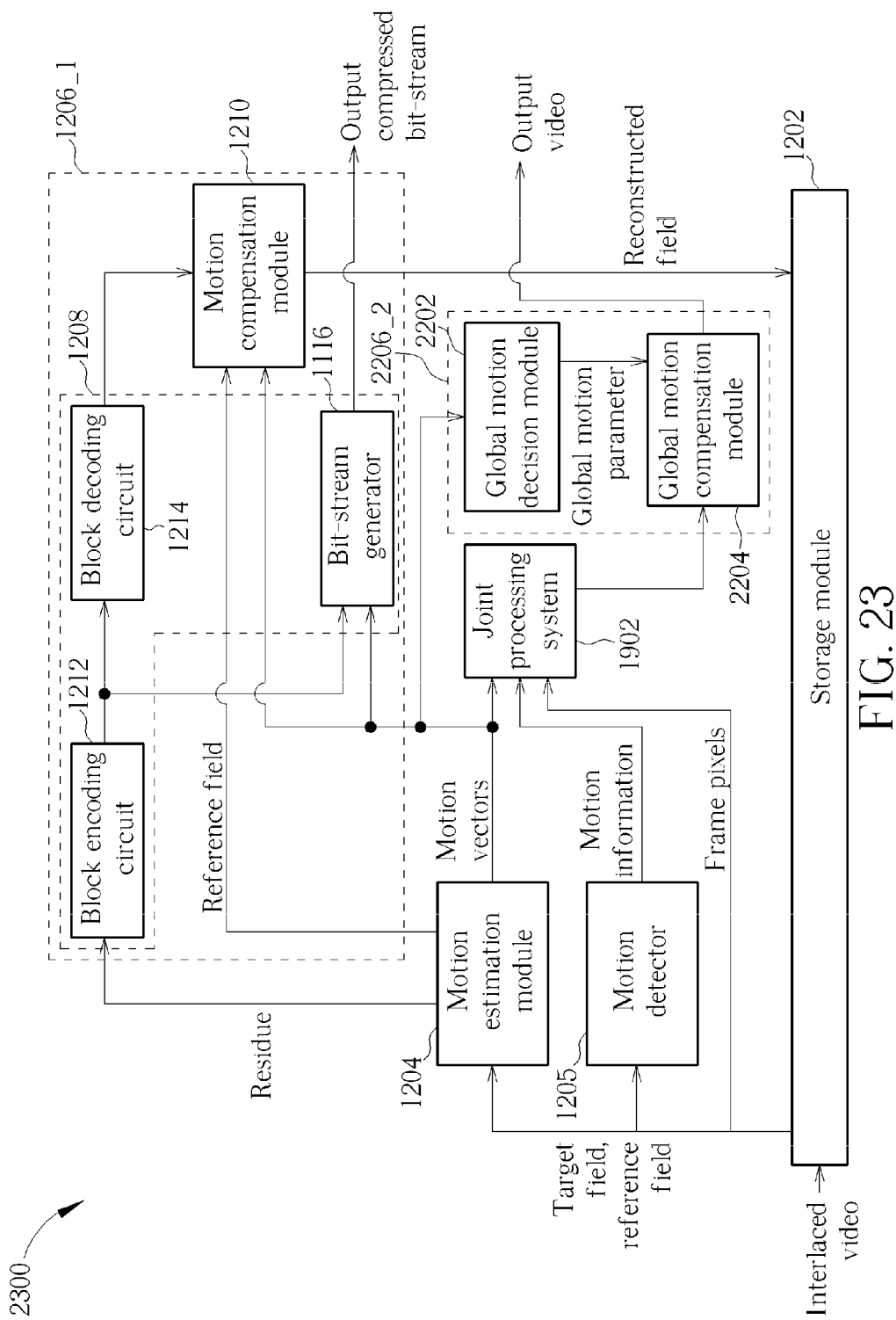
FIG. 23 is a block diagram of a video processing apparatus according to another exemplary embodiment of the present invention.

FIG. 23 is a block diagram of a video processing apparatus according to another exemplary embodiment of the present invention. The video processing apparatus 2300 employs the motion estimation sharing configuration shown in FIG. 10, and therefore has the storage module 1202, the motion estimation module 1204, the video processing blocks 1206_1, 2206_2, and additional video processing blocks (e.g., 1906_1-1906_4) implemented in the joint processing system 1902. By way of example, but not limitation, the frame pixels to be processed by the global motion compensation module 2204 for stabilizing the video contents presented by the output video are derived from a super resolution output of the adaptive scaling module 1704 of the joint processing system 1902. As a person skilled in the art can readily understand details of the video processing apparatus 2300 after reading above paragraphs, further description is omitted here for brevity.

Figure 24:
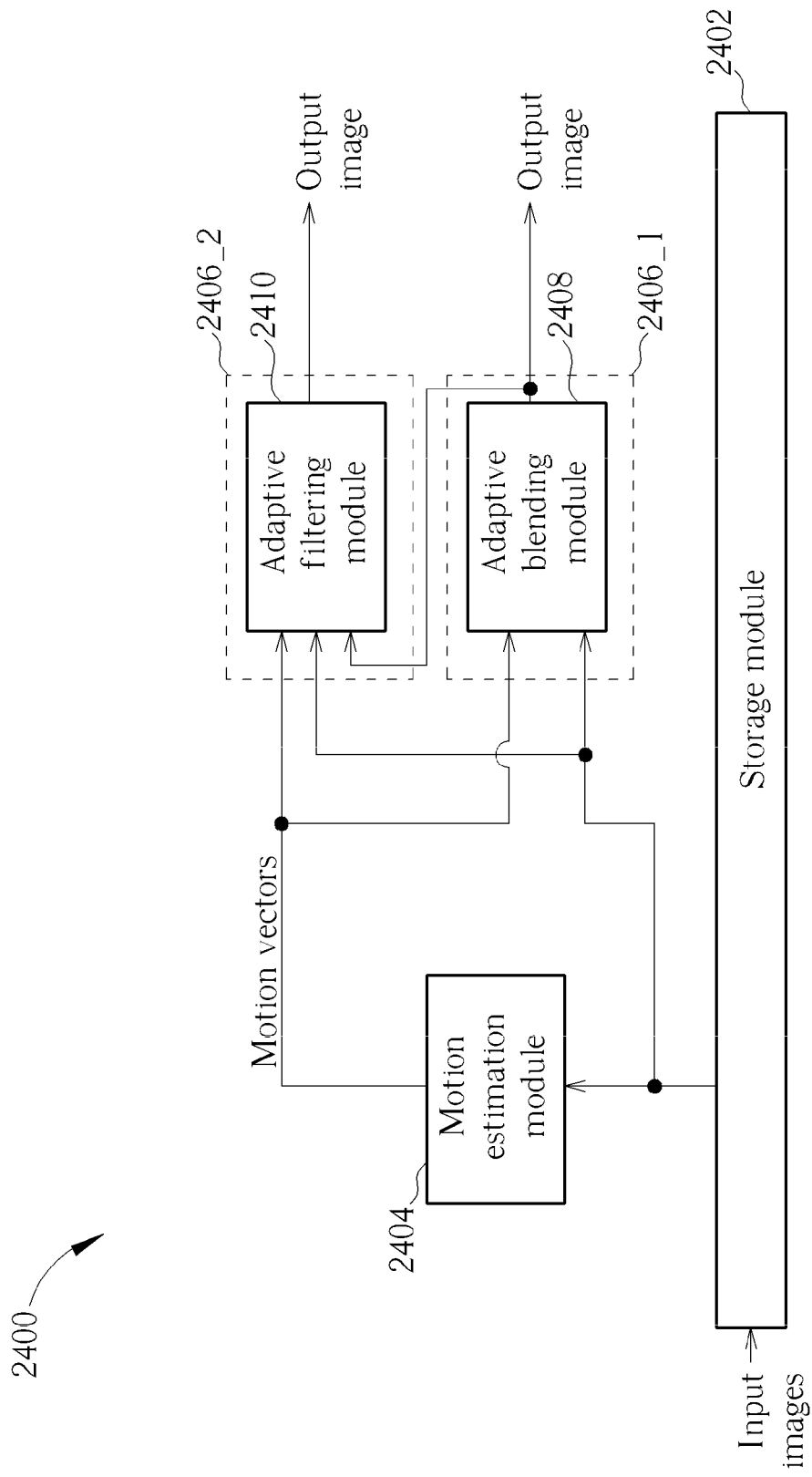
FIG. 24 is a block diagram of an image video processing apparatus according to an exemplary embodiment of the present invention.

The aforementioned video processing apparatuses 1100-2300 may be implemented in televisions for performing motion vector based video processing operations. However, the same motion estimation sharing technique may be employed in a mobile phone. The video/image processing blocks 1006_1-1006_N shown in FIG. 10 may be configured to perform different video/image processing operations selected from a group consisting of multi-frame image noise reduction, camera stabilization, high dynamic range (HDR) processing, and rolling-shutter reduction. Please refer to FIG. 24, which is a block diagram of an image processing apparatus according to an exemplary embodiment of the present invention. The image processing apparatus 2400 employs the motion estimation sharing configuration shown in FIG. 10, and therefore has a storage module 2402, a motion estimation module 2404, and a plurality of image processing blocks 2406_1, 2406_2. The storage module 2402 is used to store a plurality of input images. In this embodiment, the input images may be successive captured images generated from a camera of a mobile phone. By way of example, but not limitation, the input images may be generated by the camera using different exposure settings when the mobile phone in which the camera is disposed is not still. The motion estimation module 2404 retrieves input images from the storage module 1102, and generates motion vectors according to the input images. As can be seen from FIG. 24, the motion estimation module 2404 is shared by the adaptive filtering module 2410 and the adaptive blending module 2408. The video processing block 2406_1 is implemented using an adaptive blending module 2408, which is arranged for generating a motion compensated HDR image as an output image according to the motion vectors generated from the motion estimation module 2404 and the input images retrieved from the storage module 2402. The video processing block 2406_2 is implemented using an adaptive filtering module 2410, which is arranged for generating a motion-compensated noise-reduced image as an output image by performing multi-frame image noise reduction upon the input images according to the motion vectors generated from the motion estimation module 2404. It should be noted that the HDR image generated from the adaptive blending module 2408 may be fed into the adaptive filtering module 2410 to act as a target image to undergo the multi-frame image noise reduction. However, this is for illustrative purposes only, and is not meant to be a limitation of the present invention.

Figure 25:
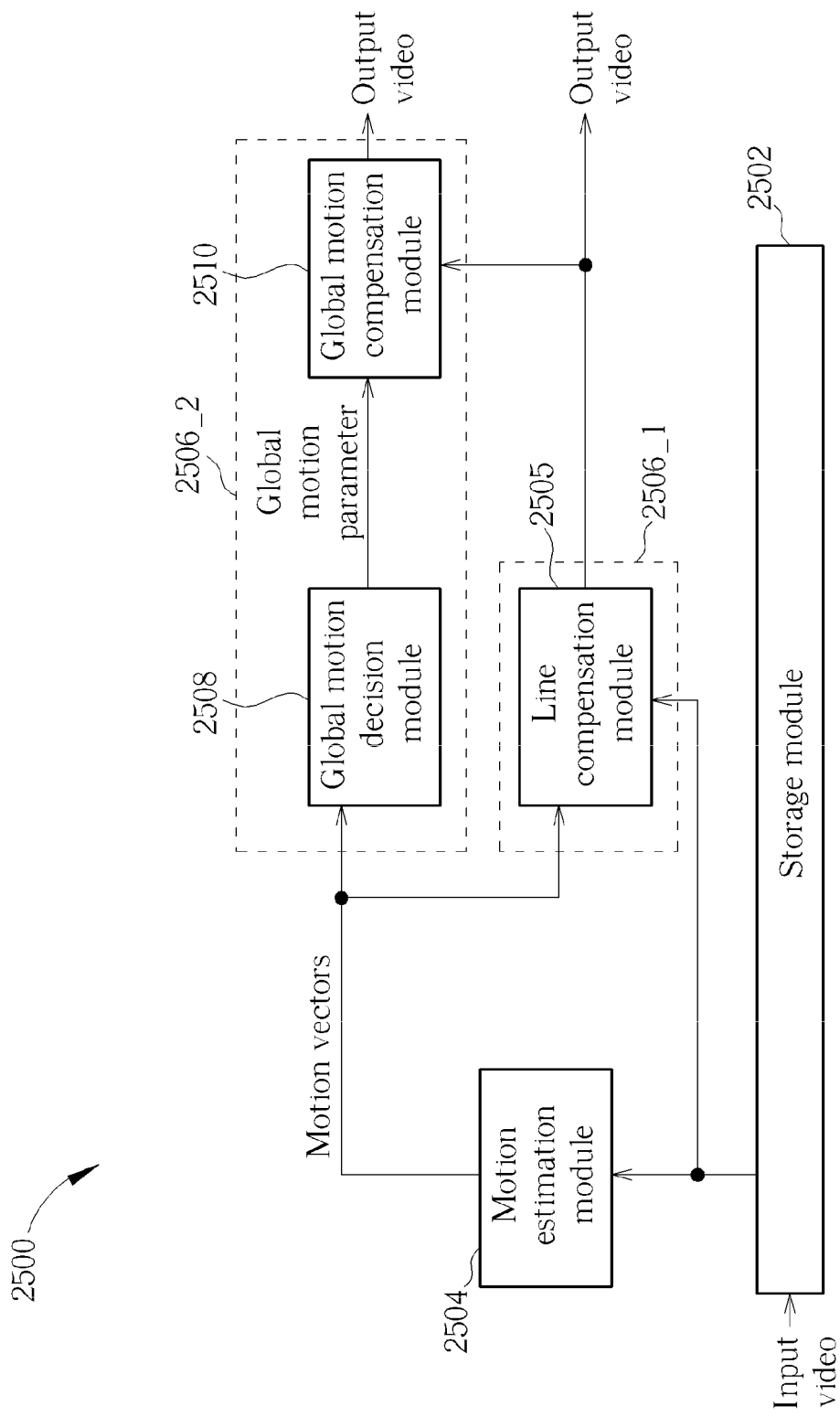
FIG. 25 is a block diagram of a video processing apparatus according to another exemplary embodiment of the present invention.

FIG. 25 is a block diagram of a video processing apparatus according to another exemplary embodiment of the present invention. The video processing apparatus 2500 employs the motion estimation sharing configuration shown in FIG. 10, and therefore has a storage module 2502, a motion estimation module 2504 and a plurality of image processing blocks 2506_1 and 2506_2. The storage module 2502 is used to store a plurality of frames of an input video. In this embodiment, the input video may be generated from a camera of a mobile phone. In a case where the camera employs CMOS sensors for detect the incident light beams, a "rolling shutter" technique is generally used to control different portions of the CMOS sensors to be light-sensitive at different time points, until an entire frame is exposed. In other words, the CMOS sensors are not exposed simultaneously. Hence, if the camera is moving during the exposure, the resultant captured frame would have rolling shutter artifacts, such as image skew. In this embodiment, the video processing block 2506_1 is therefore implemented using a line compensation module 2505, which is arranged for performing rolling-shutter reduction upon the input images according to the motion vectors generated from the motion estimation module 2404. Regarding the video processing block 2506_2, it includes a global motion decision module 2508 and a global motion compensation module 2510. The global motion decision module 2508 is used for generating a global motion parameter according to the motion vectors generated from the motion estimation module 2504, and the global motion compensation module 2510 is used for performing camera stabilization according to the global motion parameter. By way of example, but not limitation, the frame pixels to be processed by the global motion compensation module 2510 for stabilizing the video content captured by the camera may be derived from a rolling-shutter reduction output of the line compensation module 2505. However, this is for illustrative purposes only, and is not meant to be a limitation of the present invention.

Figure 26:
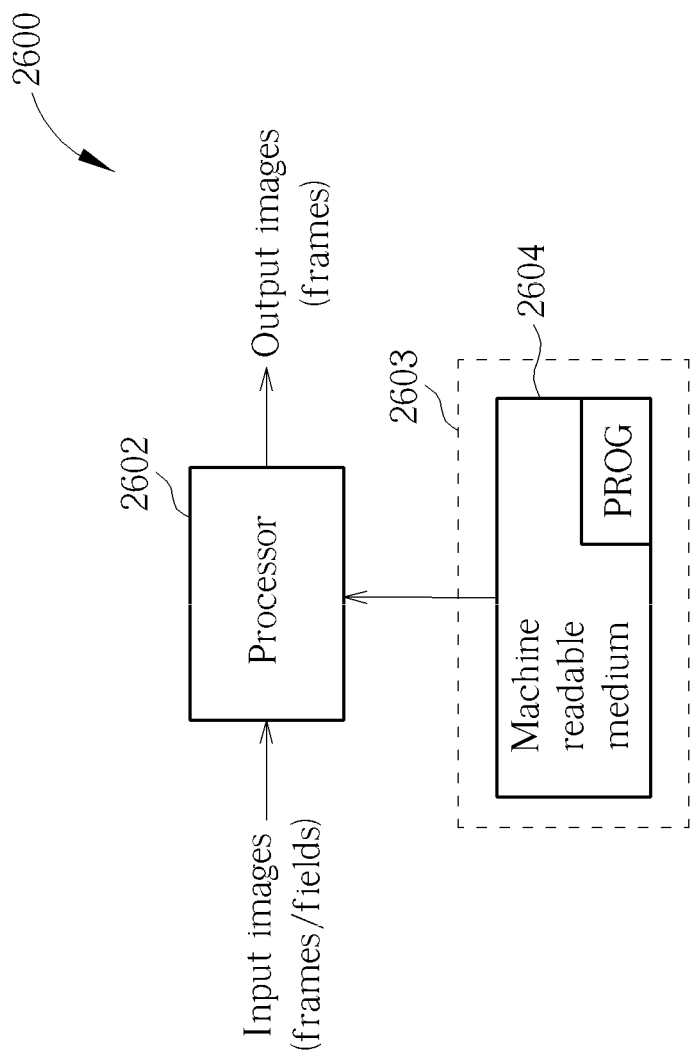
FIG. 26 is a block diagram illustrating another generalized video/image processing apparatus with motion estimation sharing according to an embodiment of the present invention.

Regarding each of the aforementioned exemplary video/image processing apparatuses, a hardware-based implementation is employed. More specifically, the motion estimation module 1004 and the video/image processing blocks 1006_1-1006_N are hardware elements. However, using a software-based implementation to realize a video/image processing apparatus with motion estimation sharing is also feasible. Please refer to FIG. 26, which is a block diagram illustrating another generalized video/image processing apparatus with motion estimation sharing according to an embodiment of the present invention. The video/image processing apparatus 2600 includes a processor 2602 and a machine readable medium 2604. For example, the processor 2602 may be a central processing unit (CPU) or a micro control unit (MCU), and at least a portion (e.g., part or all) of a storage module (e.g., a DRAM) 2603 may be the machine readable medium 2604. The machine readable medium 2604 has a program code PROG stored therein. When executed by the processor 2602, the program code PROG enables the processor 2602 to perform at least the following steps: retrieving a plurality of images (e.g., frames or fields); generating motion vectors according to the images; and performing a plurality of different video/image processing operations, respectively, wherein each of the video/image processing operations is performed according to the motion vectors. For example, each of the hardware-based video/image processing apparatuses shown in FIG. 24 and FIG. 25 may be implemented using the software-based video/image processing apparatus 2600 shown in FIG. 26. These alternative designs also fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video/image processing apparatus, comprising:
a storage module, for storing a plurality of images;
a motion estimation module, coupled to the storage module, for retrieving the images from the storage module, and generating motion vectors according to the images; and
a plurality of video/image processing blocks, coupled to the motion estimation module, for performing a plurality of different video/image processing operations, respectively, wherein each of the video/image processing blocks is arranged for receiving the motion vectors generated from the motion estimation module, and referring to the received motion vectors to perform a designated video/image processing operation;
wherein the video/image processing blocks comprise at least one of a first video/image processing block and a second video/image processing block; the first video/image processing block comprises:
a motion compensation module, for performing frame rate conversion according to the received motion vectors; and
the second video/image processing block comprises:
a video coding module, for encoding the images to generate a compressed bit-stream according to the received motion vectors.

2. The video/image processing apparatus of claim 1, wherein the second video/image processing block further comprises:
a motion compensation module, coupled to the storage module and the video coding module, for generating a reconstructed frame according to one of the images and the received motion vectors, and storing the reconstructed frame into the storage module.

3. The video/image processing apparatus of claim 1, wherein one of the video/image processing blocks comprises:
an adaptive filtering module, for performing motion compensated video noise reduction according to the received motion vectors.

4. The video/image processing apparatus of claim 1, wherein one of the video/image processing blocks comprises:
an adaptive interpolation module, for performing motion compensated video deinterlacing according to the received motion vectors.

5. The video/image processing apparatus of claim 1, wherein one of the video/image processing blocks comprises:
an adaptive scaling module, for performing multi-frame super resolution processing according to the received motion vectors.

6. The video/image processing apparatus of claim 1, wherein one of the video/image processing blocks comprises:
a global motion decision module, for generating a global motion parameter according to the received motion vectors; and
a global motion compensation module, for performing video stabilization according to the global motion parameter.

7. The video/image processing apparatus of claim 1, wherein one of the video/image processing blocks comprises:
an adaptive filtering module, for performing multi-frame image noise reduction according to the received motion vectors.

8. The video/image processing apparatus of claim 1, wherein one of the video/image processing blocks comprises:
a global motion decision module, for generating a global motion parameter according to the received motion vectors; and a global motion compensation module, for performing camera stabilization according to the global motion parameter.

9. The video/image processing apparatus of claim 1, wherein one of the video/image processing blocks comprises:
an adaptive blending module, for generating a high dynamic range (HDR) image according to the received motion vectors.

10. The video/image processing apparatus of claim 1, wherein one of the video/image processing blocks comprises:
a line compensation module, for performing rolling-shutter reduction according to the received motion vectors.

11. A video/image processing method, comprising:
retrieving a plurality of images from a storage module;
generating motion vectors according to the images; and
performing a plurality of different video/image processing operations, respectively, wherein each of the video/image processing operations is performed according to the motion vectors;
wherein the video/image processing operations comprise at least one of a first video/image processing operation and a second video/image processing operation;
the first video/image processing operation comprises:
performing frame rate conversion according to the received motion vectors; and
the second video/image processing operation comprises:
encoding the images to generate a compressed bitstream according to the received motion vectors.

12. The video/image processing method of claim 11, wherein the second video/image processing operation further comprises:
generating a reconstructed frame according to one of the images and the received motion vectors, and storing the reconstructed frame into the storage module.

13. The video/image processing method of claim 11, wherein one of the video/image processing operations comprises:
performing motion compensated video noise reduction according to the received motion vectors.

14. The video/image processing method of claim 11, wherein one of the video/image processing operations comprises:
performing motion compensated video deinterlacing according to the received motion vectors.

15. The video/image processing method of claim 11, wherein one of the video/image processing operations comprises:
performing multi-frame super resolution processing according to the received motion vectors.

16. The video/image processing method of claim 11, wherein one of the video/image processing operations comprises:
generating a global motion parameter according to the received motion vectors; and
performing video stabilization according to the global motion parameter.

17. The video/image processing method of claim 11, wherein one of the video/image processing operations comprises:
performing multi-frame image noise reduction according to the received motion vectors.

18. The video/image processing method of claim 11, wherein one of the video/image processing operations comprises:
generating a global motion parameter according to the received motion vectors; and
performing camera stabilization according to the global motion parameter.

19. The video/image processing method of claim 11, wherein one of the video/image processing operations comprises:
generating a high dynamic range (HDR) image according to the received motion vectors.

20. The video/image processing method of claim 11, wherein one of the video/image processing operations comprises:
performing rolling-shutter reduction according to the received motion vectors.

21. A non-transitory machine readable medium storing a program code, wherein when executed by a processor, the program code enables the processor to perform at least the following steps:
retrieving a plurality of images;
generating motion vectors according to the images; and
performing a plurality of different video/image processing operations, respectively, wherein each of the video/image processing operations is performed according to the motion vectors;
wherein the video/image processing operations comprise at least one of a first video/image processing operation and a second video/image processing operation;
the first video/image processing operation comprises:
performing frame rate conversion according to the received motion vectors; and
the second video/image processing operation comprises:
encoding the images to generate a compressed bitstream according to the received motion vectors.

* * * * *